United States Patent
Wang et al.

(10) Patent No.: US 10,445,323 B2
(45) Date of Patent: Oct. 15, 2019

(54) ASSOCIATION RULE MINING WITH THE MICRON AUTOMATA PROCESSOR

(71) Applicant: UNIVERSITY OF VIRGINIA PATENT FOUNDATION, Charlottesville, VA (US)

(72) Inventors: Ke Wang, Charlottesville, VA (US); Kevin Skadron, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 567 days.

(21) Appl. No.: 14/871,457

(22) Filed: Sep. 30, 2015

(65) Prior Publication Data
US 2017/0091287 A1   Mar. 30, 2017

(51) Int. Cl.
  *G06F 16/245*   (2019.01)
  *G06F 16/2458*  (2019.01)

(52) U.S. Cl.
  CPC .... *G06F 16/24569* (2019.01); *G06F 16/2465* (2019.01)

(58) Field of Classification Search
  CPC ........... G06F 17/30539; G06F 15/7839; G06F 17/30519; G06F 16/24569; G06F 16/2465
  USPC ....................................................... 707/776
  See application file for complete search history.

(56) References Cited

U.S. PATENT DOCUMENTS

| | | | |
|---|---|---|---|
| 4,835,775 A * | 5/1989 | Seroussi | H03M 13/033 714/784 |
| 8,150,873 B2 * | 4/2012 | Lee | G06F 16/24568 707/776 |
| 8,478,762 B2 * | 7/2013 | Vojnovi | G06F 16/24578 707/748 |
| 9,081,928 B2 * | 7/2015 | Van Eijndhoven | G06F 8/456 |
| 2003/0023591 A1 * | 1/2003 | Ma | G06F 7/02 707/999.006 |
| 2003/0097367 A1 * | 5/2003 | Ma | G06F 16/284 707/999.102 |
| 2005/0160095 A1 * | 7/2005 | Dick | H04L 63/0428 707/999.01 |
| 2006/0149766 A1 * | 7/2006 | Ghoting | G06F 16/2465 707/999.101 |
| 2007/0299855 A1 * | 12/2007 | Levin | G06F 16/313 707/E17.009 |

(Continued)

*Primary Examiner* — Phong H Nguyen
(74) *Attorney, Agent, or Firm* — Westerman, Hattori, Daniels & Adrian, LLP

(57) ABSTRACT

The present invention discloses a heterogeneous computation framework, of Association. Rule Mining (ARM) using Micron's Autotmata Processor (AP). This framework is based on the Apriori algorithm. Two Automaton designs are proposed to match and count the individual itemset. Several performance improvement strategies are proposed including minimizing the number of reporting vectors and reduce reconfiguration delays. The experiment results show up to 94× speed ups of the proposed AP-accelerated Apriori on six synthetic and real-world datasets, when compared with the Apriori single-core CPU implementation. The proposed AP-accelerated Apriori solution also outperforms the state-of-the-art multicore and GPU implementations of Equivalence Class Transformation (Eclat) algorithm on big datasets.

25 Claims, 19 Drawing Sheets

(56) References Cited

U.S. PATENT DOCUMENTS

| | | | |
|---|---|---|---|
| 2008/0256417 A1* | 10/2008 | Andersson | H03M 13/15 714/762 |
| 2009/0323547 A1* | 12/2009 | Caesar, Jr. | H04L 43/0847 370/252 |
| 2010/0063774 A1* | 3/2010 | Cook | G05B 15/02 702/181 |
| 2014/0013054 A1* | 1/2014 | Chang | G06F 12/0895 711/122 |
| 2015/0212906 A1* | 7/2015 | Gschwind | G06F 11/1474 714/15 |

\* cited by examiner (a)

(b)

(a)

(b)

(c)

(a)

(b)

(c)

(a)

(b)

ASSOCIATION RULE MINING WITH THE MICRON AUTOMATA PROCESSOR

TECHNICAL FIELD

The present invention relates to hardware acceleration of data mining. More specifically, this invention proposes a heterogeneous computer architecture to accelerate association rule mining using a hardware accelerator.

BACKGROUND

Association Rule Mining (ARM), also referred as Frequent Set Mining (FSM), is a data-mining technique that identifies strong and interesting relations between variables in datasets using different measures of interestingness. ARM has been a key module of many recommendation so systems and has created many commercial opportunities for on-line retail stores. In the past ten years, this technique has also been widely used in web usage mining, traffic accident analysis, intrusion detection, market basket analysis, bioinformatics, etc.

As modern datasets continue to grow rapidly, the execution efficiency of ARM becomes a bottleneck for its application in new domains. Many previous studies have been devoted to improving the performance of sequential CPU-based ARM implementation. Different data structures were proposed to include horizontal representation, vertical representation, and matrix representation (Document 1). Multiple renowned algorithms have been developed including Apriori (Document 2), Eclat (Document 3), and FP-growth (Document 4). A number of parallel acceleration based solutions have also been developed on multi-core CPU (Document 5), GPU (Document 6), and FPGA (Document 7).

Recently, Micron proposed a novel and powerful non-von Neumann architecture—the Automata Processor (AP). The AP architecture demonstrates a massively parallel computing ability through a huge number of state elements. It also achieves fine-grained communication ability through its configurable routing mechanism. These advantages make the AP suitable for pattern-matching centered tasks like ARM. Very recently, the AP has been successfully used to accelerate the tasks of regular expression matching (Document 8) and DNA motif searching (Document 9).

RELATED WORKS

Sequential Algorithms

A sequential algorithm is an algorithm that Is executed sequentially; once through, from start to finish, without other processing executing, as opposed to concurrently or in parallel. After describing the association rule mining problem (Document 10), Agrawal and Srikant proposed the Apriori algorithm. The Apriori algorithm is a well known and widely used algorithm. It prunes the search space of itemset candidates in a breadth-first-search scheme the using downward-closure property.

The Equivalent Class Clustering Eclat algorithm was developed by Zaki (Document 3). The typical Eclat implementation adopts a vertical bitset representation of transactions and depth-first-search. The low level operation, e.g. the bit-level intersection of two itemsets, exposes more instruction-level parallelism, which enables Eclat to outperform Apriori on conventional architectures, such as CPU or GPU.

Document 4 introduced another popular ARM algorithm, FP-growth. By utilizing a Frequent-Pattern tree data structure to avoid multi-pass database scanning, FP-growth has very good performance in many cases. However, the poor memory-size scaling of the Frequent-Pattern tree prevents the use of FP-growth for very large databases.

Multi-Thread & Multi-Process

Document 11 developed a parallel version of the Apriori algorithm for a shared memory (SM) multi-core platform. This implementation achieved 8× speedup on a 12-processor SM multi-core platform for synthetic datasets, Document 12 proposed a parallel version of FP-growth on a multi-core processor. This work achieved 6× speedup on an 8-core processor.

Document 13 proposed a parallel algorithm of FP-growth achieving 22.6× speedup on a 32-node cluster. Document 14 developed an MPI version of the Apriori algorithm and achieved 6× speedup on an 8-node cluster.

Accelerators

A field-programmable gate array (FPGA) is an integrated circuit designed to be configured by a customer or a designer after manufacturing. General-purpose computing on graphics processing units (GPGPU) is the use of a graphics processing unit (GPU), which typically handles computation only for computer graphics, to perform computation in applications traditionally handled by the central processing unit (CPU). In the present invention, GPU refers to the GPGPU. An FPGA-based solution was proposed to accelerate the Eclat algorithm (Document 15), This solution achieved a speedup of 68× on a four-FPGA board with respect to the CPU sequential implementation of Eclat.

Document 16 designed a GPU-accelerated implementation of Apriori. 2×-10× speedup is achieved with NVIDIA GeForce GTX 280 GPU when compared with CPU sequential implementation. Document 6 proposed another GPU-accelerated Eclat implementation and achieved 6×-30× speedup relative to the state-of-the-art sequential Eclat and VP-Growth implementations. Zhang also proposed the Frontier Expansion algorithm, which hybridizes breadth-first-search and depth-first-search to expose more parallelism in this Eclat implementation. This implementation also generalizes the parallel paradigm by a producer-consumer model that makes the implementation applicable to multi-core CPU and multiple GPUs.

According to the previous cross-algorithm comparison, there is no clear winner among the different sequential algorithms and implementations. However, Zhang's Eclat is believed to be the fastest parallel ARM implementation. Thus, the AP-accelerated Apriori implementation of the present invention is compared with Zhang's parallel Eclat implementation on both multi-core CPU and GPU platforms. However, as more parallelism is exposed, the vertical representation of many itemsets has to be kept in the memory (main memory or GPU global memory) simultaneously. The trade-off between memory and performance (parallelism) still exists, particularly for large datasets on the GPU. In contrast, the AP-accelerated Apriori solution in the present invention does not rely on local memory and therefore, is less sensitive to the data size.

The document is herein incorporated by the following references in its entirety.

DOCUMENT LIST

1. J. Han, H. Cheng, D. Xin, and X. Yan, "Frequent pattern mining: Current status and future directions;" Data Min. Knowl. Discov., vol. 15, no, 1, pp. 55-86, August 2007.
2. R. Agrawal and R. Srikant, "Fast algorithms for mining association rules in large databases," in Proceedings of the 20th International Conference on Very Large Data Bases, ser. VLDB '94. San Francisco, Calif., USA: Morgan Kaufmann Publishers Inc., 1994, pp. 487-499.
3. M. J. Zaki, "Scalable algorithms for association mining," IEEE Trans, on Knowl. and Data Eng., vol. 12, no. 3, pp. 372-390, May 2000.
4. J. Han, J. Pei, and Y. Yin, "Mining frequent patterns without candidate generation," in Proceedings of the 2000 ACM SIGMOD International Conference on Management of Data, ser. SIGMOD '00. New York, N.Y., USA; ACM, 2000, pp. 1-12.
5. Y. Zhang, E Zhang, and J. Bakos, "Frequent itemset mining on large-scale shared memory machines" in Cluster Computing (CLUSTER), 2011 IEEE International Conference on, September 2011, pp. 585-589.
6. F. Zhang, Y. Zhang, and J. D. Bakos, "Accelerating frequent itemset mining on graphics processing units," J. Supercomput., vol. 66, no. 1, pp. 94-117, October 2013.
7. Y. Zhang, F. Zhang, Z. Jin, and J. D. Bakos, "An fpga-based accelerator for frequent itemset mining," ACM Trans. Reconfigurable Technol. Syst., vol. 6, no. 1, pp. 2:1-2:17, May 2013.
8. P. Dlugosch, D. Brown, P. Glendenning, M. Leventhal, and H. Noyes, "An efficient and scalable semiconductor architecture for parallel automata processing," IEEE Transactions on Parallel and Distributed Systems, vol. 99, no. PrePrints, p. 1, 2014.
9. I. Roy and S. Aluru, "Finding motifs in biological sequences using the micron automata processor," in Proceedings of the 2014 IEEE 28th International Parallel and Distributed Processing Symposium, ser. IPDPS '14. Washington, D.C., USA: IEEE Computer Society, 2014, pp. 415-424.
10. R. Agrawal, T. Imieliński, and A. Swami, "Mining association rules between sets of items in large databases," in Proceedings of the 1993 ACM SIGMOD International Conference on Management of Data, ser. SIGMOD '93. New York, N.Y., USA: ACM, 1993, pp. 207-216.
11. M. J. Zaki, M. Ogihara, S. Parthasarathy, and W. Li, "Parallel data mining for association rules on shared-memory multi-processors," in Proceedings of the 1996 ACM/IEEE Conference on Supercomputing, ser. Supercomputing '96. Washington, D.C., USA: IEEE Computer Society, 1996.
12. L. Liu, E. Li, Y. Zhang, and Z, Tang, "Optimization of frequent itemset mining on multiple-core processor," in Pro-ceedings of the 33rd International Conference on Very Large Data Bases, ser. VLDB '07. VLDB Endowment, 2007, pp. 1275-1285.
13. Pramudiono and M. Kitsuregawa, "Parallel fp-growth on pc cluster," in Proceedings of the 7th Pacific-Asia Conference on Advances in Knowledge Discovery and Data Mining, ser. PAKDD '03. Berlin, Heidelberg: Springer-Verlag, 2003, pp. 467-473.
14. E. Ansari, D. G. H., M. Keshtkaran, and H. Kaabi, "Distributed frequent itemset mining using trie data structure," vol. 35, no. 3, p. 377, September 2008.
15. Y. Zhang, F. Zhang, Z. Jin, and J. D. Bakos, "An fpgabased accelerator for frequent itemset mining," ACM Trans. Reconfigurable Technol. Syst., vol. 6, no. 1, pp. 2:1-2:17, May 2013.
16. W. Fang, M. Lu, X. Xiao, B. He, and Q. Luo, "Frequent itemset mining on graphics processors;" in Proceedings of the Fifth International Workshop on Data Management on New Hardware, ser. DaMoN '09. New York, N.Y., USA: ACM. 2009, pp. 34-42.
17. C. Borgelt, "Efficient implementations of apriori and eclat," in Proc. 1st IEEE ICDM Workshop on Frequent Item Set Mining Implementations (FIMI 2003, Melbourne, Fla.). CEUR Workshop Proceedings 90, 2003, p. 90.
18. "Frequent itemset mining dataset repository," http://fimi.ua.ac.be/data/.
19. J. Rabaey, A. Chandrakasan, and B. Nikolić, Digital Integrated Circuits, 2/e. Pearson Education, 2003.
20. Ke Wang, Yanjun Qi, Jeffrey J. Fox, Mircea Stan, and Kevin Skadron. "Association Rule Mining with the Micron Automata Processor," 29th IEEE international Parallel & Distributed Processing Symposium, IPDPS '15.

SUMMARY

In accordance with some embodiments, a heterogeneous computation framework of Association Rule Mining (ARM) using Micron's Autotmata Processor (AP) is proposed. This framework is based on the Apriori algorithm. Two Automaton designs are proposed to match and count the individual itemset: one use state transient element (STE) and counter to deal with sorted transactions; another use STE, counter and boolean to deal with unsorted transactions. Several performance improvement strategies are proposed including minimizing the number of reporting vectors, trading slow routing reconfiguration with lightweight symbol reconfiguration. Up to 129× and 49× speedups are achieved by the AP-accelerated Apriori on seven synthetic and real-world datasets, when compared with the Apriori singlecore CPU implementation and Eclat, a more efficient ARM algorithm, 6-core multicore CPU implementation, respectively. The AP-accelerated Apriori solution also outperforms GPU implementations of Eclat especially for large datasets.

BRIEF DESCRIPTION OF THE DRAWINGS

For a better understanding of the aforementioned embodiments of the invention as well as additional embodiments thereof, reference should be made to the Description of Illustrative Embodiments below, in conjunction with the following drawings in which like reference numerals refer to corresponding parts throughout the figures.

It is noted that FIGS. 2-4 and 12-16 are prepared with the AP Workbench, and that the dashed line boxes in FIGS. 12-16 are not part of the automaton design and added for illustration purposes only.

DESCRIPTION OF ILLUSTRATIVE EMBODIMENTS

Figure 1:
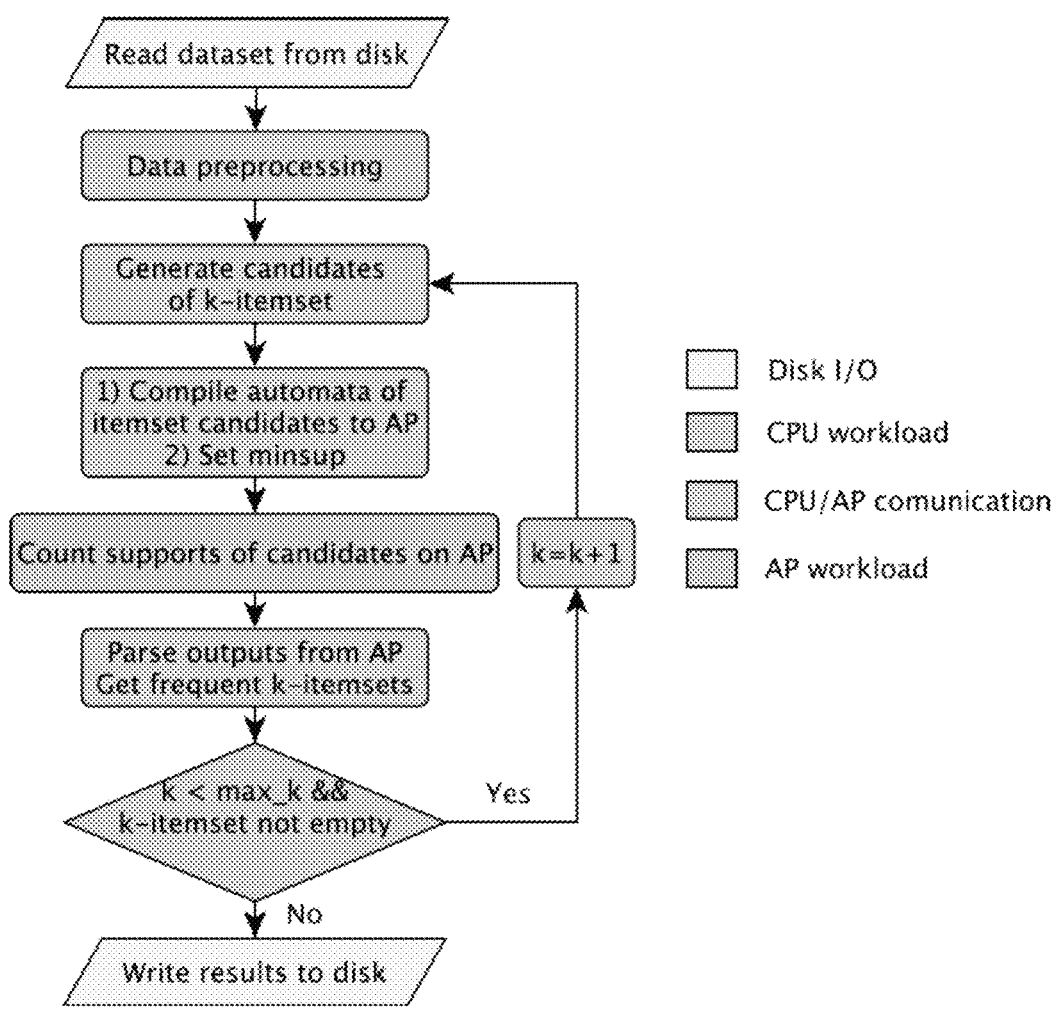
FIG. 1 illustrates the whole workflow of AP-accelerated ARM in accordance with some embodiments.

Reference will now be made in detail to embodiments, examples of which are illustrated in the accompanying drawings. In the following detailed description, numerous specific details are set forth in order to provide a thorough understanding of the present invention. However, it will as be apparent to one of ordinary skill in the an that the present invention may be practiced without these specific details. In other instances, well-known methods, procedures, components, circuits, and networks have not been described in detail so as not to unnecessarily obscure aspects of the embodiments.

The objects of the present invention are the followings:
1. A CPU-AP computing infrastructure to improve the Apriori algorithm based ARM is developed;
2. A novel automaton structure for the matching and counting operations in ARM is designed. This structure provides a balanced solution for trading the slow routing reconfiguration with APs fast symbol replacements; and
3. A performance improvement and broader capability over multi-core and GPU implementations of Eclat ARM on large datasets by the AP ARM solution is shown.

SUMMARY OF EMBODIMENTS

In accordance with the first embodiment, a processor for discovering a pattern of frequently associated items in large datasets, the processor comprises functional elements comprising: a plurality of state transition elements based on memory columns implemented in DRAM (Dynamic Random-Access Memory) memory technology; a plurality of counters; and a plurality of boolean elements, wherein the processor is capable of fast replacement of symbol sets of the plurality of state transition elements and threshold values of the plurality of counters, wherein the plurality of counters and the plurality of boolean elements are designed to work with the plurality of state transition elements to increase space efficiency of automata implementation, and wherein the pattern includes sets, continuous sequences, and discontinuous sequences in the large datasets.

The processor according to the first embodiment, wherein the processor is implemented in PCRAM (Phase-Change Random-Access Memory), STTRAM (Spin-Transfer Torque Random-Access Memory), or RRAM (Resistive Random-Access Memory).

The processor according to the first embodiment, wherein each of the plurality of state transition elements is configured to match a set of any multiple-bit signals.

The processor according to the first embodiment, wherein a group of the plurality of state transition elements is connected to implement a non-deterministic finite automaton (NFA) to match the pattern in the large datasets.

The processor according to the first embodiment, wherein the plurality of counters are configured to connect to a finite automaton to count occurrences of the pattern in the datasets and make reports or activate the functional elements when a predetermined threshold is reached.

The processor according to the first embodiment, wherein the finite automaton is accommodated on a chip and is capable of matching and counting a plurality of patterns in parallel.

The processor according to the first embodiment, wherein the processor takes input streams of multiple-bit signals and is capable of processing a plurality of data streams concurrently.

The processor according to the first embodiment, wherein any of the functional elements are configured as a reporting element, wherein the reporting element generates a one-bit or multiple-bit signals when the functional elements match with input streams of multiple-bit signals.

In accordance with the second embodiment, an automaton design method of discovering a pattern of frequently associated items in large datasets by a processor, the method comprising steps of: applying Apriori algorithm framework for reducing a search space in the datasets; preprocessing an input data set for making it compatible with a working interface of the processor; and designing automata for implementing matching and counting of the pattern in the datasets, wherein the pattern includes sets, continuous sequences, and discontinuous sequences in the large datasets.

The automaton design method according to the second embodiment, wherein the matching is implemented by a finite automaton.

The automaton design method according to the second embodiment, wherein the matching is capable of capturing the patterns in the datasets.

The automaton design method according to the second embodiment, wherein the pattern is represented by a linearly connected array of states of automata with one or more states of automata grouped together to match one multiple-bit signal from input streams of multiple-bit signals.

The automaton design method according to the second embodiment, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

The automaton design method according to the second embodiment, wherein the sets are converted to the discontinuous sequences by sorting items of each transaction with a predefined order.

The automaton design method according to the second embodiment, wherein on-chip Boolean logic components are utilized to discover occurrence of every item of a given associated item set and to identify a superset of the given set.

The automaton design method according to the second embodiment, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

The automaton design method according to the second embodiment, wherein the counting uses an on-chip counter of the processor to calculate a frequency of the pattern associated items in the datasets.

The automaton design method according to the second embodiment, wherein the method further comprises steps of minimizing an output from the processor by delaying reporting of events to a final processing cycle.

The automaton design method according to the second embodiment, wherein the preprocessing of the input data set in the datasets further comprises steps of: filtering out infrequent items from the input data set; encoding the filtered items into multiple-bit signals; and sorting the encoded items within one transaction with a given order.

The automaton design method according to the second embodiment, the preprocessing of the input data set is iterated to explore ail sets of the frequently associated items in the large datasets.

In accordance with the third embodiment, an electronic automaton device for discovering a pattern of frequently associated items in large datasets comprising: a finite automaton; and a counter element, wherein the electronic automaton device recognizes the pattern and creates a signal when occurrence of the pattern exceeds a given threshold, and wherein the pattern includes sets, continuous sequences, and discontinuous sequences in the large datasets.

The electronic automaton device according to the third embodiment, wherein the pattern is represented by a linearly connecting array of states of automata with one or more states of automata grouped together to match one multiple-bit signal from input streams of multiple-bit signals.

The electronic automaton device according to the third embodiment, wherein one or more self-activating states of automata connected to one group of states of automata for multiple-bit signals to hold a position within a potential pattern sequence when a mismatching of multiple-bit signals is seen, and hold this position until an end of an transaction, in order to deal with the discontinuous sequences.

The electronic automaton device according to the third embodiment, wherein the sets are converted to the discontinuous sequences by sorting items of each transaction with a predefined order.

The electronic automaton device according to the third embodiment, wherein on-chip Boolean logic components are utilized to discover occurrence of every item of a given associated item set and to identify a superset of the given set.

The electronic automaton device according to the third embodiment, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

The electronic automaton device according to the third embodiment, wherein the counter element is connected to a pattern matching automaton to calculate a frequency of the pattern in the datasets.

Association Rule Mining

Association rule mining (ARM) among sets of items was first described by Agrawal and Srikant. (Document 10). The ARM problem was initially studied to find regularities in the shopping behavior of customers of supermarkets and has since been applied to very broad application domains.

In the ARM problem, $I=i_1, i_2, \ldots, i_m$ is defined as a set of interesting items. Let $T=t_1, t_2, \ldots t_n$ be a dataset of transactions, each transaction is a subset of I. Define $x_i=\{i_{s1}, i_{s2}, \ldots i_{sl}\}$ be a set of items in I, called an itemset. The itemset with k items is called k-itemset. A transaction $t_p$ is said to cover the itemset $x_q$ iff (if and only if) $x_q \subset t_p$. The support of $Sup(x_q)$, is the number of transactions that cover it. An itemset is known as frequent iff its support is greater than a given threshold value called minimum support, minsup. The goal of association rule mining is to find out all itemsets which supports are greater than minsup.

Automata Processor

Micron's Automata Processor (AP) is a massively parallel non-von Neumann accelerator designed for high-throughput pattern mining.

Function Elements

The AP chip has three types of functional elements—the state transition element (STE), the counters, and the Boolean elements (Document 8). The state transition element is the central feature of the AP chip and is the element with the highest population density. Counters and Boolean elements are designed to work with STEs to increase the space efficiency of automata implementations and to extend computational capabilities beyond NFAs.

Speed and Capacity

Micron's current generation AP—D480 chip is built on 45 nm technology running at an input symbol (8-bit) rate of 133 MHz. The D480 chip has two half-cores and each half-core has 96 blocks. Each block has 256 STEs, 4 counters, and 12 Boolean elements. In total, one D480 chip has 49,152 processing state elements, 2,304 programmable Boolean elements, and 768 counter elements (Document 8). Each AP board can have up to 48 AP chips that can perform matching in parallel (Document 11). Each AP chip has a worst case power consumption of 4 W (Document 8). The power consumption of a 48-core AP board is similar to a high-end GPU card.

Each STE can be configured to match a set of any 8-bit symbols. The counter element counts the occurrence of a pattern described by the NFA connected to it and activates other elements or reports when a given threshold is reached. One counter can count up to $2^{12}$ which may not be enough for ARM counting in some cases. In such a scenario, two counters can be combined to handle a larger threshold. Counter elements are a scarce resource of the AP current-generation chip and therefore, are a main limiting factor of the capacity of the ARM automaton in the present invention.

Input and Output

The AP takes input streams of 8-bit symbols. Each AP chip is capable of processing up to 6 separate data streams concurrently. The data processing and data transfer are implicitly overlapped by using the input double-buffer of the AP chip. Any STE can be configured to accept the first so symbol in the stream (called start-of-data mode, small "1" in the left-upper corner of STE in the following automaton illustrations), to accept every symbol in the input stream (called all-input mode, small "∞" in the left-upper corner of STE in the following automaton illustrations) or to accept a symbol only upon activation. The all-input mode will consume one extra STE.

Any type of element on the AP chip can be configured as a reporting element; one reporting as element generates an one-bit signal when the element matches the input symbol. One AP chip has up to 6144 reporting elements. If any reporting element reports at a cycle, the chip will generate an output vector which contains signals of "1" corresponding to the elements that report at that cycle and "0"s for reporting elements that do not report. If too many output vectors are generated, the output buffer can fill up and stall the chip. Thus, minimizing output vectors is an important consideration for performance optimization.

Programming and Reconfiguration

Automata Network Markup Language (ANML) is an XML language for describing the composition of automata networks. ANML is the basic way to program automata on the AP chip. Besides ANML, Micron provides a graphical user interface tool called the AP Workbench for quick automaton designing and debugging. A "macro" is a container of automata for encapsulating a given functionality, similar to a function or subroutine in common programming languages. A macro can be defined with parameters of symbol sets of STEs and counter thresholds, which can be instantiated with actual arguments. Micron's AP SDK also provides C and Python interfaces to build automata, create input streams, parse output and manage computational tasks on the AP board.

Placing automata onto the AP fabric involves three steps: placement and routing compilation, routing configuration, and STE symbol set configuration. The initial compilation of automata onto the AP involves all these three steps, while the pre-compiled automata only requires the last two steps. The compilation optimization usually takes tens of seconds. The routing configuration of the whole board needs about 5 milliseconds. The symbol set configuration takes approximately 45 milliseconds for an entire board.

Mapping ARM Problem Onto the AP

Apriori Algorithm

The Apriori algorithm framework is adopted for the AP to reduce the search space as itemset size increases. The Apriori algorithm is based on downward-closure property: all the subsets of a frequent itemset are also frequent and thus for an infrequent itemset, all its supersets must also be infrequent. In the Apriori framework, candidates of (k+1)-itemsets are generated from known frequent k-itemsets by adding one more possible frequent Item. The mining begins at 1-itemset and the size of candidate itemsets increases by one at each level. In each level, the Apriori algorithm has two major operations:

1. Generating candidates of frequent (k+1)-itemsets from known frequent k-itemsets; and
2. Counting support numbers of candidate itemsets and comparing these support numbers with minsup.

The support counting step is the performance bottleneck of the Apriori algorithm, particularly for the large datasets. The hardware features of the AP are well suited for matching and support-counting many itemsets in parallel. Therefore, the AP is used to accelerate the support-counting step in each level.

Program Infrastructure

FIG. 1 shows the complete workflow of the AP-accelerated ARM. The data preprocessing stage creates a data stream from the input transactional dataset and makes the data stream compatible with the AP interface. Preprocessing consists of the following steps:

1. Filter out infrequent items from transactions;
2. Recede items into 8-bit or 16-bit symbols;
3. Recede transactions;
4. Sort items in transactions; and
5. Connect transactions by a special separator symbol to form the input data stream for the AP.

Step 1 is a common step in almost all existing ARM implementations that helps to avoid unnecessary computing on infrequent items and reduces the number of items and transaction sizes. Depending on the population of frequent items, the items can be encoded by 8-bit (freq_item#<255) or 16-bit symbols (254<freq_#item#<64516) in Step 2. Different encoding schemes lead to different automaton designs. Step 3 deletes infrequent items from the transactions, applies the codes of items to ail transactions, encodes transaction boundary markers, and removes very short transactions (less than two items). Step 4 sorts items in each transaction (in any given order) to avoid needing to consider all permutations of a given itemset, and therefore, saves STE resources on the AP. Descending sorting is adopted according to item frequency (proposed by Borgelt (Document 17)). The data pre-processing is only executed once in the whole workflow.

Each iteration of the loop shown in FIG. 1 explores all frequent k-itemsets from the candidates generated from (k−1)-itemsets. The candidates are generated from the CPU and are compiled onto the AP by using the automaton structure designed in this paper. The input data formulated in pre-processing is then streamed into the AP for counting.

Automaton for Matching and Counting

Figure 2:
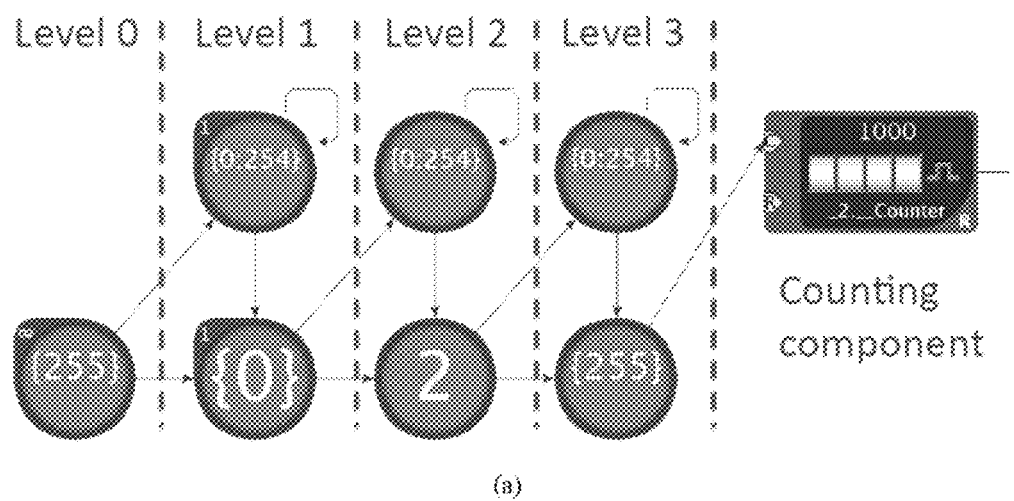
FIG. 2 illustrates initial design of Automata for ARM itemset matching and support counting in accordance with some embodiments. Blue circles and black box are STEs (State Transition Elements) and counters, respectively. The numbers on an STB represent the symbol set that STE can match. "0:254" means any number in the range of 0-254. Symbol 255 is reserved as the transaction separator. The dash lines and texts are auxiliaries for better understanding.
Figure 2:
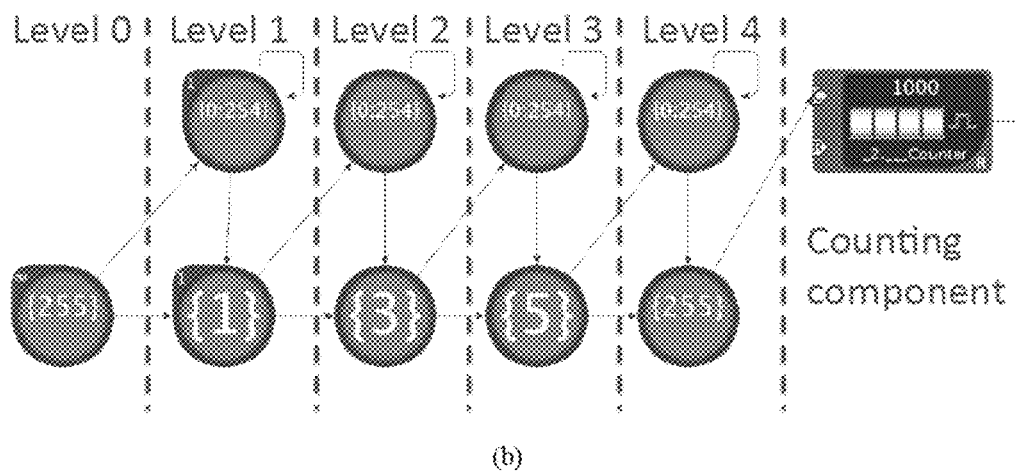

FIG. 2 shows the initial automaton design for ARM. The items are coded as digital numbers in the range from 0 to 254, with the number 255 reserved as the separator of transactions. Each automaton for ARM has two components: matching and counting. The matching component is implemented by an NFA, the groups of STEs in FIGS. 2(a) and 2(b), to recognize a given itemset. Note that unlike string matching, the itemset matching in ARM needs to consider the cases of discontinuous patterns of items.

For example, consider the itemset of {6,11}; in transactions such as (Documents 1, 6, and 11) or (Documents 3, 6, 11, and 15), item "11" is next to item "6", while, in other cases such as (Documents 2, 6, 8, and 11) or (Documents 6-9 and 11), there are an unknown number of items between "6" and "11". The designed NFA can capture all possible continuous and discontinuous variants of a given itemset. The only requirement is the order of items appearing in the transactions, which is already guaranteed by sorting in data pre-processing.

As shown in FIG. 2, the NFA for itemset matching can be divided into multiple levels. Each level except "Level 0" has two STEs: the top STE holds the activation in this level and the bottom STE triggers the next level if one item in a given transaction matches it. For each automaton corresponding to a given itemset, activation begins at "Level 0" and will move forward (to the right) to "Level 1" when the transaction separator is seen in the Input. Each level will trigger the next level if the item represented by this level (bottom STE) is seen in the input. If the item of the current level is not seen, the activation of the current level will be held by the top symbol, until the end of this transaction when separator symbol is seen. The itemset matching Is restarted in the beginning of each transaction by the "Level 0" STE.

The counting component uses an on-chip counter element to calculate the frequency of a given itemset. If the last level has been triggered, the matching component waits for the separator symbol to indicate the end of a transaction. The separator symbol then activates the counter, incrementing it by one. If the threshold, which is set to minsup, is reached in the counter, this automaton produces a report signal at this cycle. After processing the whole dataset on the AP, the output vectors are retrieved. Each itemset with a frequency above the minimum support will appear in the output. Although the automata shown in FIG. 2 already implement the basic functions of matching and counting for ARM, there is still much room for performance optimization.

Performance Optimization

Three optimization strategies to maximize the computation performance of the AP are discussed.

Output Optimization

Figure 3:
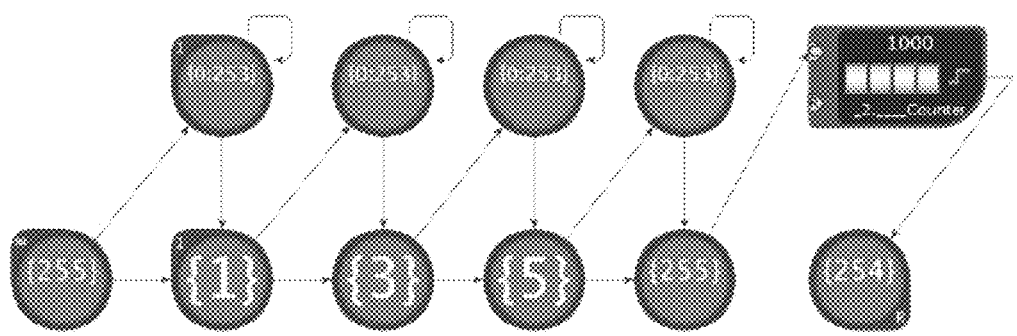
FIG. 3 illustrates optimization for minimizing the output in accordance with some embodiments. The node with 254 is the "reporter.

The first strategy is to minimize the output from the AP. In the initial automaton design, the AP chip creates a report vector at each cycle whenever there is at least one counter report. Each report vector carries the information about the cycle count for this report Therefore, the AP chip creates many report vectors during the data processing. These report vectors may fill up the output buffers and cause stalls during processing. However, solving the ARM problem only requires identifying the frequent itemsets; the cycle at which a given itemset reaches the minimum support level is irrelevant. Therefore, the design of the reporting element and postpone all reports to the last cycle is modified (FIG. 3). The "latch" property of the counter is utilized to keep activating another STE connected to this counter after the counter minsup is reached. This STE is called the "reporter". One symbol (i.e., 254) is reserved to indicate the end of a transaction stream and this end-of-stream symbol matches to the reporter STE and triggers fee actual output. Consequently, the global set of items is 0-253, which ensures that the ending symbol 254 will not appear in the middle of the transaction stream. With this modification, only one output vector will be produced in the end of data stream.

Another benefit of this modification is that it eliminates the need to merge multiple report vectors as a post-processing step on the CPU. Instead, the counting results can be parsed from only one report vector.

Avoid Routing Reconfiguration

As shown in FIG. 2, when the mining of k-itemsets finishes, the automata for (k+1)-itemset need to be compiled onto the AP to replace the automata for k-itemsets. The automata reconfiguration involves both routing reconfiguration and symbol replacement steps, because the NFAs that recognize itemsets of different sizes have different structures (compare FIGS. 2(a) and 2(b)). On the other hand, the AP also provides a mechanism to only replace the symbol set for each STE while the connections between AP elements are not modified. The time of symbol replacement depends on how many AP chips are involved. The max symbol replacement time is 45 ms if all STEs update their symbol sets.

To remove the routing reconfiguration step, a general automaton structure supporting item-sets with different sizes is discussed. The idea is to add multiple entry paths to the NFA shown in FIG. 2. To count the support of a given itemset, only one of the entry paths is enabled by matching to the transaction separator symbol, while the other entry paths are blocked by a reserved special symbol. This special symbol can be the same as the data stream ending symbol (i.e., "254"). This structure is called multiple-entry NFA for variable-size itemset (ME-NFA-VSI). 10% total reconfiguration time, 5 ms, is saved by using the ME-NFA-VFI structure.

Figure 4:
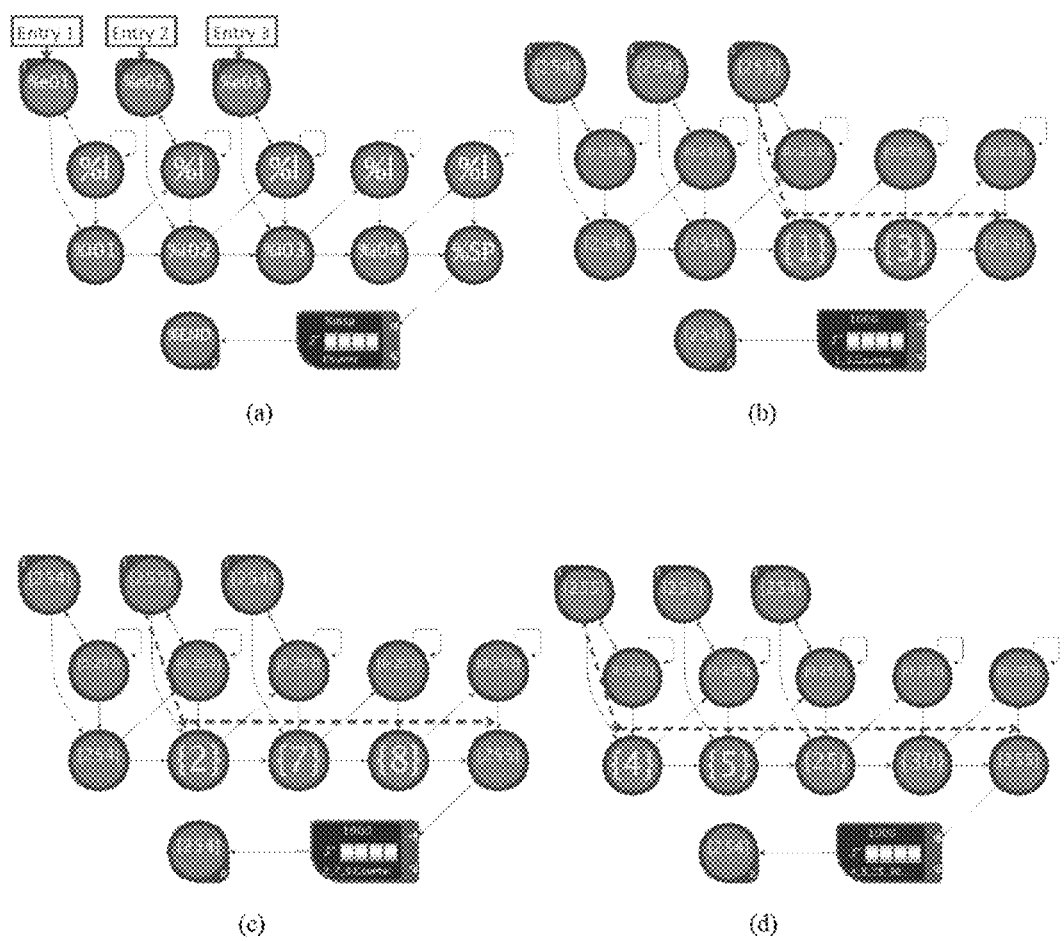
FIG. 4 illustrates a small example of multiple-entry NFA for variable-size itemset support counter for 2-itemset, 3-itemset, and 4-itemset in accordance with some embodiments, (a) is the macro of this ME-NFA-VSI with parameters.

FIG. 4 shows a small-scale example of an ME-NFA-VSI structure that can count an itemset of size 2 to 4. FIG. 4(a) shows the ANML macro of this ME-NFA-VSI structure, leaving some parameters to be assigned for a specific itemset. % e<01-% e03 are symbols for three entries. An entry can be configured as either "255" or "254", to present "enabled" and "disable" status. Only one entry is enabled for a given itemset. % I represents the global set of items, I. % i01-% i04 are individual symbols of items in the itemset. % SP is the transaction separator and % END is the ending symbol of the input stream.

To count a 2-itemset, the first two entries are blocked by "254" and the third entry is enabled by "255" (FIG. 4(b)). Similarly, this structure can be configured to counting a 3-itemset and a 4-itemset by enabling a different entry point (FIGS. 4(c) and 4(d)).

Another optimization has been made to reduce STE usage of ME-NFA-VSI structure by switching entry STEs from all-input mode to start-of-data mode with a bi-directional connection to "% I" STE (FIG. 4(a)). The max number of the optimized ME-NFA-VSI structures that can fit on the AP chip is mainly limited by the number of counter elements. Therefore, it is possible to compile large ME-NFA-VSI structures on the AP chip without sacrificing capacity. In the 8-bit symbol encoding scheme, one block of the AP chip can support two ME-NFA-VSI structures that match itemsets of size 2 to 40. For the 16-bit-symbol encoding scheme, an ME-NFA-VSI structure that matches itemset of size 2 to 24 is used. 24 is a reasonable upper bound of itemset size.

Concurrent Mining k-Itemset and (k+1)-Itemset

At the very beginning (k is small) and the end (k is large) of mining, the number of candidates could be too small to make full use of the AP board. In these cases, the number candidates of the (k+1)-itemset is predicted by assuming all k-itemset candidates are frequent. If the total number of k-itemset candidates and predicted (k+1)-itemset candidates can fit onto the AP board, (k+1)-itemset candidates are generated and frequent, k-itemsets and (k+1)-itemsets are concurrently mined in one round. This optimization takes advantage of unified ME-NFA-VSI structure and saves about 5%-10% AP processing time in general.

EXPERIMENTAL RESULTS

The performance of the AP implementation is evaluated using CPU timers (host codes) and an AP simulator in the AP SDK (Document 11) (AP codes), assuming a 48-core D480 AP board.

Capacity and Overhead

The AP-accelerated Apriori algorithm (Apriori-AP) switches between 8-bit and 16-bit encoding schemes automatically in the "data preprocessing" stage shown in the flowchart (FIG. 1). In an 8-bit scheme, the items are coded with symbols from "0" to "253". If more than 254 frequent items are represented after filtering, two 8-bit symbols are used to represent one item (16-bit symbol scheme). In both encoding schemes, the symbol "255" is reserved for the transaction separator, and the symbol "254" is reserved for both the input ending symbol and the entry-blockers for the ME-NFA-VSI structure. By using the ME-NFA-VSI structure, one AP board can match and count 18,432 Itemsets in parallel with sizes from 2 to 40 for 8-bit encoding and 2 to 24 for 16-bit encoding. 24 is a reasonable upper bound of the sizes of the itemsets. If there are more than 18,432 candidate itemsets, multiple passes are required. Before each single pass, a symbol replacement process is applied to reconfigure all ME-NFA-VSI structures on the board, which takes 0.045 second.

Comparison with Other Implementations

The computation times from Borgelt's Apriori CPU sequential implementation (Document 18) is used as a baseline. Because the AP accelerates the counting operation at each Apriori iteration, the performance results of both the counting operation and the overall computation are shown, A state-of-the-art CPU serial implementation of Eclat (Eclat-1C), a multi-threading implementation of Eclat (Eclat-6C) (Document 6), and a GPU-accelerated implementation of Eclat (Eclat-1G) (Document 6) are compared. All of the above implementations are tested using the following hardware:

CPU: Intel® Xeon® CPU E5-1650 (6 physical cores, 3.20 GHz);
Mem: 32 GB, 1.333 GHz; and
GPU: Nvidia Kepler K20C, 706 MHz clock, 2496 CUDA cores, 4.8 GB global memory.

For each benchmark, the performance of the above implementations over a range of minimum support values is compared. A lower support number requires a larger search space and more memory usage, since fewer itemsets are filtered during mining. To have all experiments finished in a reasonable time, minimum support numbers that produce computation times of the Apriori-CPU implementation that is in the range from 1 second to 5 hours for any dataset smaller than 1GB and from 1 second to 10 hours for larger datasets are selected. The relative minimum support number, defined as the ratio of minimum support number to the total number of transactions, is used.

Datasets

Three commonly-used real-world datasets from the Frequent Itemset Mining Dataset Repository (Document 19), three synthetic datasets and one real-world dataset generated (ENWiki) are tested. The details of these datasets are shown in Tables 1 and 2. T40D500K and T10020M are obtained from the IBM Market-Basket Synthetic Data Generator. Webdocs5× is generated by duplicating transactions of Webdocs 5 times.

The ENWiki is the English Wikipedia downloaded in December 2014. All paragraphs containing non-roman characters and all MediaWiki markups are removed. The resulting dataset contains about 1,461,281 articles, 11,507,383 sentences (defined as transactions) with 6,322,092 unique words. A dictionary by ranking the words using their frequencies is constructed. Capital letters are all converted into lower case and numbers are replace with the special "NUM" word. In natural language processing field, the idea that some aspects of word semantic meaning can be induced from patterns of word co-occurrence is becoming increasingly popular. The association rule mining provides a suite of efficient tools for computing such co-occurred word clusters.

Apriori-AP vs. Apriori-CPU

Figure 5:
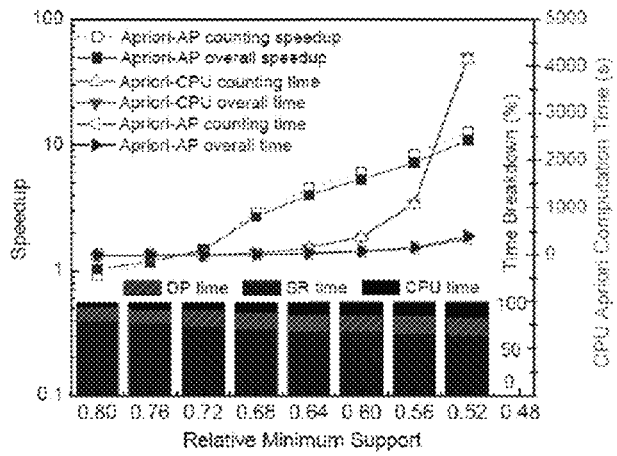
FIG. 5 illustrates the performance results of Apriori-AP on three real-world benchmarks in accordance with some embodiments. DP time, SR time, and CPU time represent the data process time on AP, symbol replacement time on AP and CPU time, respectively, Webdocs switches to 16-bit encoding when relative minimum support is less then 0.1. 8-bit encoding is applied in other cases.
Figure 5:
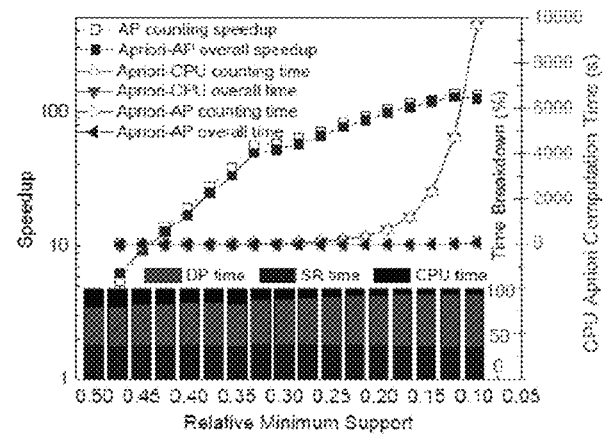
Figure 5:
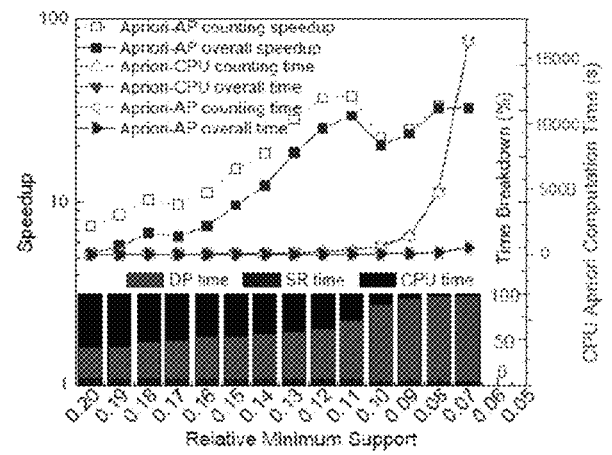

FIG. 5 shows the performance comparison between the Apriori-AP solution in the present invention and the classic Apriori-CPU implementation on three real-world datasets. The computation time of Apriori-CPU grows exponentially as minimum support number decreases for three datasets, while Apriori-AP shows much less computation time and much slower growth of computation time as minimum support number decreases. As a result, the speedup of Apriori-AP over Apriori-CPU grows as support decreases and achieves up to 129× speedup. The drop in the speedup at the relative minimum support of 0.1 for Webdocs is caused by switching from 8-bit encoding to 16-bit encoding, which doubles the size of the input stream. The speedup increases again after this point. For small and dense datasets like Pumsb, data processing time is relatively low, while the symbol replacement takes up to 80% of the total computation time. Though the symbol replacement is a light-weight reconfiguration, frequent symbol replacement decreases the AP hardware utilization. Also, the increasing CPU time of Apriori-AP on small and dense datasets leads to a smaller relative utilization of the AP when the minimum support decreases. In contrast, larger datasets like Accidents and Webdocs spend relatively more time on data processing, and the portion of data processing time goes up as the support decreases. This analysis indicates the Apriori-AP solution in the present invention exhibits superior relative performance for large datasets and small minimum support values.

Figure 6:
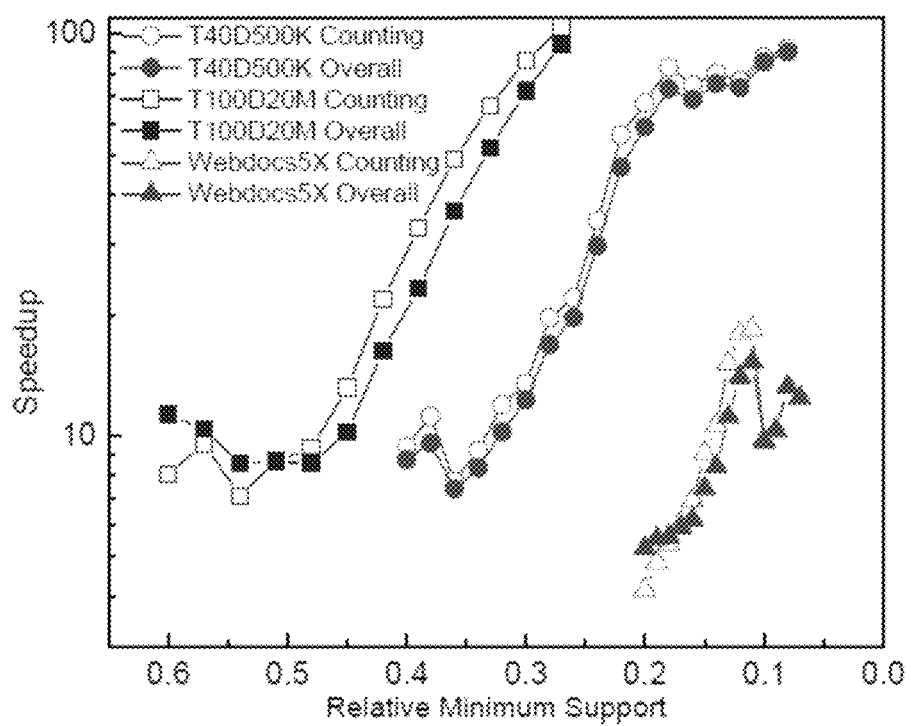
FIG. 6 illustrates the speedup of AP accelerated algorithm over CPU Apriori on three synthetic benchmarks in accordance with some embodiments.

FIG. 6 shows similar trends of Apriori-AP speedup over Apriori-CPU on three synthetic

TABLE 1

Real-World Datasets

| Name | Trans# | Aver. Len. | Item# | Size (MB) |
|---|---|---|---|---|
| Pumsb | 49046 | 74 | 2113 | 16 |
| Accidents | 340183 | 33.8 | 468 | 34 |
| Webdocs | 1692082 | 177.2 | 5267656 | 1434 |
| ENWiki | 11507383 | 70.3 | 6322092 | 2997.5 | benchmarks. Up to 94× speedups are achieved for the T100D20M dataset. In all above the cases, the difference between the counting speedup and overall speedup is due to the computation on the host CPU, This difference will decrease as the total computation time increases for large datasets.

Figure 7:
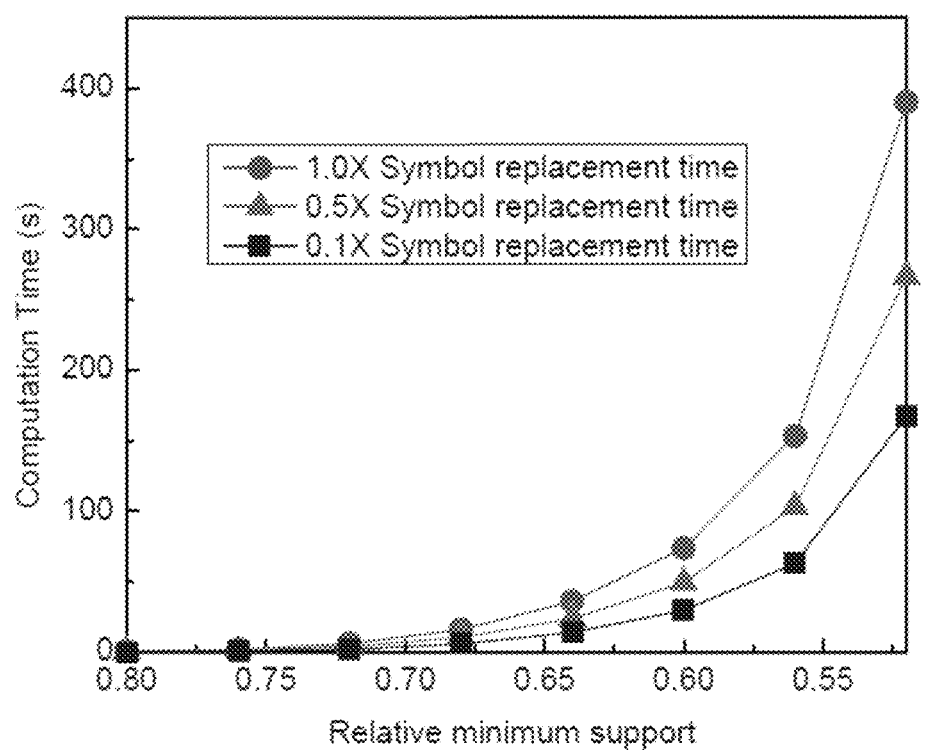
FIG. 7 illustrates the impact of symbol replacement time on Apriori-AP performance for Pumsb in accordance with some embodiments.

The symbol replacement latency can be quite important for small and dense datasets that require multiple passes in each Apriori iteration, but this latency may be significantly reduced in future generations of the AP. FIG. 7 shows how symbol replacement time affects the total Apriori-AP computation time. A reduction of 90% in the symbol replacement time leads to 2.3×-3.4× speedups of the total computation time. The reduction of symbol replacement latency will not affect the performance behavior of Apriori-AP for large datasets, since data processing dominates so the total computation time.

Apriori vs. Eclat

Equivalent Class Clustering (Eclat) is another algorithm based on Downward-closure. Eclat uses a vertical representation of transactions and depth-first-search strategy to minimize memory usage. Document 6 proposed a hybrid depth-first/breadth-first search scheme to expose more parallelism for both multi-thread and GPU versions of Eclat. However, the trade-off between parallelism and memory usage still exists. For large datasets, the finite memory (main or GPU global memory) will become a limiting factor for performance, and for very large datasets, the algorithm fails. While there is a parameter which can tune the trade-off between parallelism and memory occupancy, the default setting of this parameter (Document 6) is used for better performance.

Figure 8:
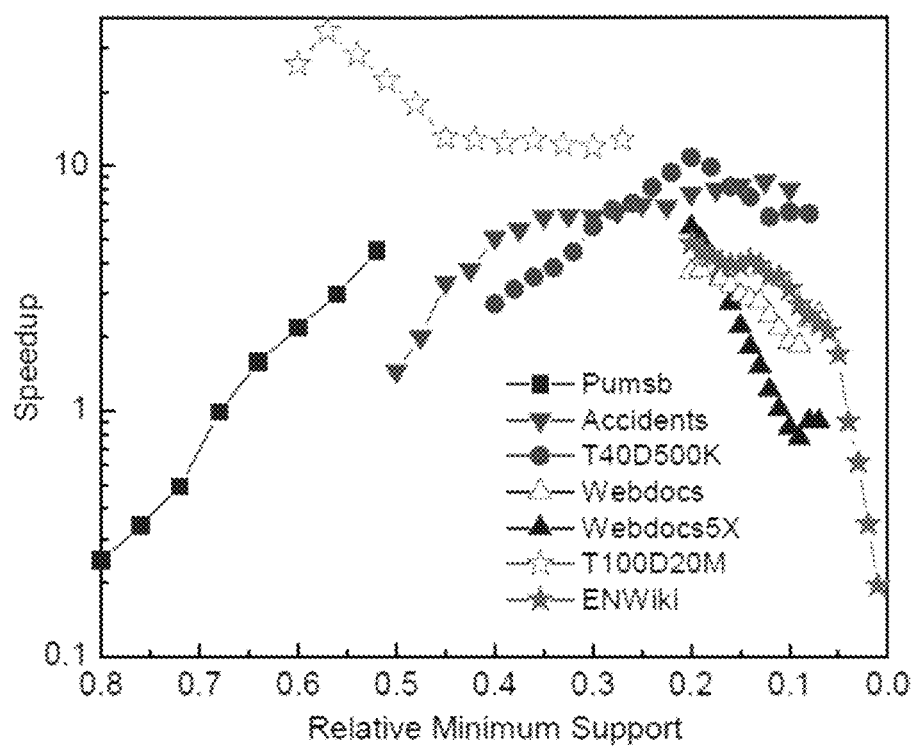
FIG. 8 illustrates performance comparison of CPU sequential Apriori and Eclat in accordance with some embodiments.

FIG. 8 shows the speedups that the Eclat sequential algorithm achieved with respect to sequential Apriori-CPU. Though Eclat has 8× performance advantage in average cases, the vertical bitset representation become less efficient for sparse and large dataset (high #trans and #freq_item

TABLE 2

Synthetic Datasets

| Name | Trans# | Aver. Len. | Item# | ALMP | Size (MB) |
|---|---|---|---|---|---|
| T40D500K | 500K | 40 | 100 | 15 | 49 |
| T100D20M | 20M | 100 | 200 | 25 | 6348.8 |
| Webdocs5X | 8460410 | 177.2 | 5267656 | N/A | 7168 | ratio). This situation becomes worse as the support number decreases. The Apriori-CPU implementation usually achieves worse performance than Eclat though the performance boost of counting operation makes Apriori-AP a competitive solution to parallelized Eclat.

Three factors make Eclat a poor lit for the AP, though it has better performance on CPU:
 1. Eclat requires bit-level operations, but the AP works on byte-level symbols;
 2. Eclat generates new vertical representations of transactions for each new itemset candidate, while dynamically changing the values in the input stream is not efficient using the AP; and
 3. Even the hybrid search strategy cannot expose enough parallelism to make full use of the AP chips.

Figure 9:
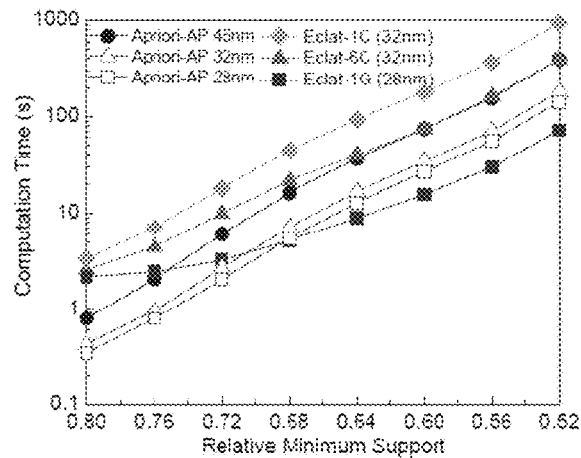
FIG. 9 illustrates performance comparison among Apriori-AP, Eclat-1C, Eclat-6C, and Eclat-1G with technology normalization on three small datasets in accordance with some embodiments.
Figure 9:
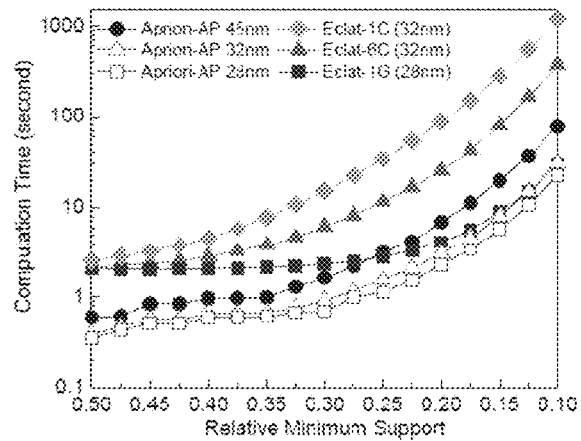
Figure 9:
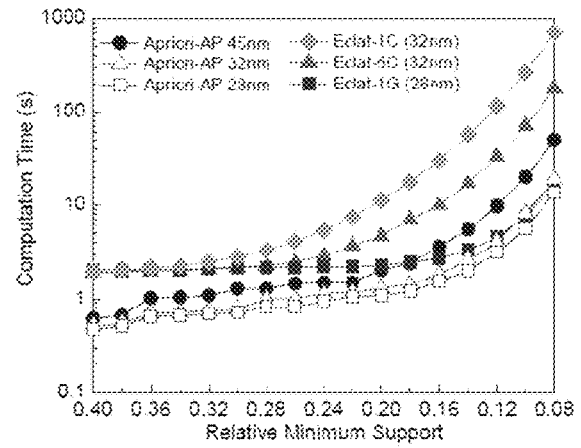
Figure 10:
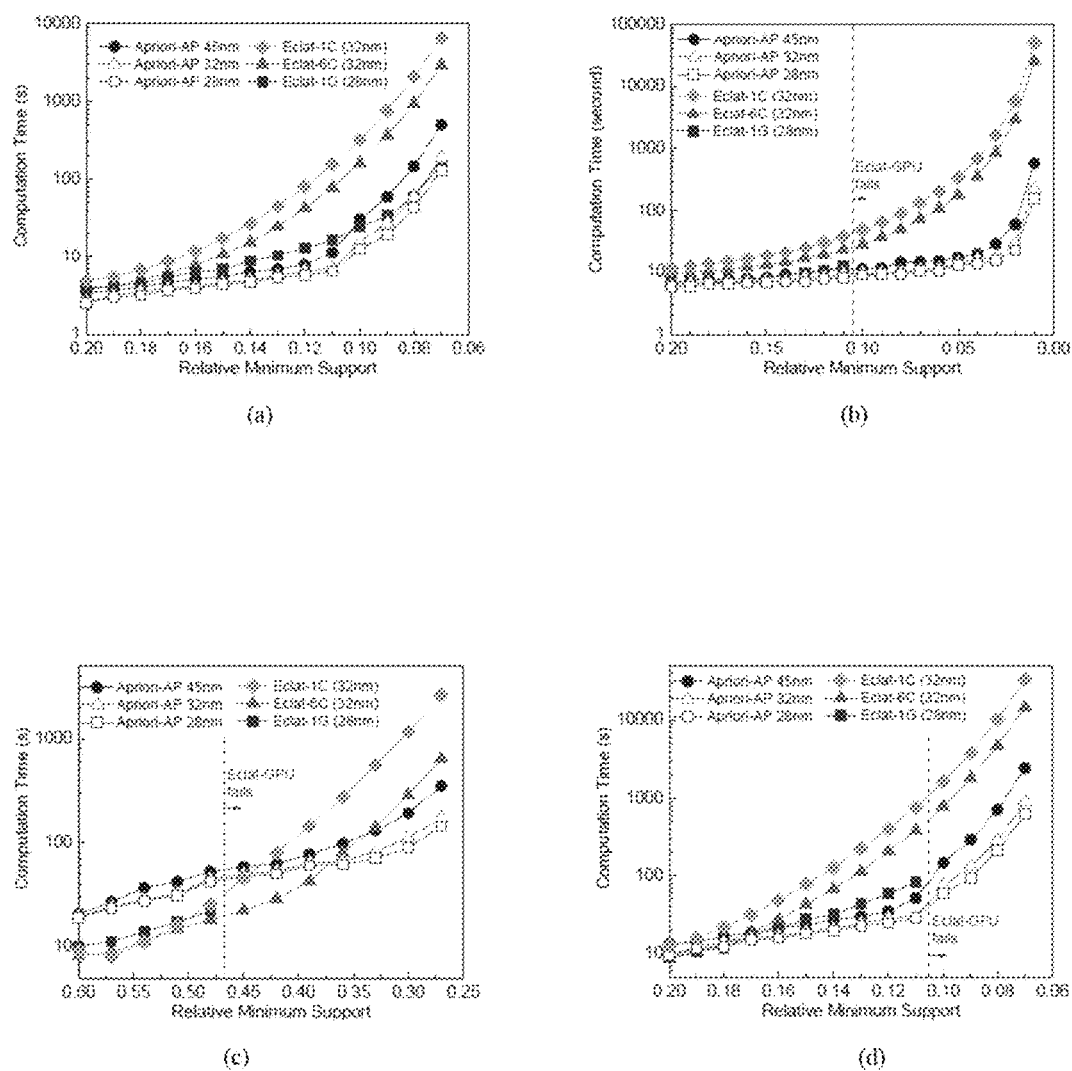
FIG. 10 illustrates performance comparison among Apriori-AP, Eclat-1C, Eclat-6C and Eclat-1G with technology normalization on four large datasets in accordance with some embodiments.

FIGS. 9 and 10 show the performance comparison between Apriori-AP (45 nm for current generation of AP), and sequential, multi-core, and GPU versions of Eclat. Generally, Apriori-AP shows better performance than sequential and multi-core versions of Eclat. The GPU version of Eclat shows better performance in Pumsb, Accidents and Webdocs when the minimum support number is small. However, because of the constraint of GPU global memory, Eclat-1G fails at small support numbers for three large datasets—ENWiki, T100D20M, and Webdocs5x. ENWiki, as a typical sparse dataset, causes inefficient storage of bitset representation in Eclat and leads to early failure of Eclat-GPU and up to 49× speedup of Apriori-AP over Eclat-6C. In other benchmarks, Apriori-AP shows up to 7.5× speedup over Eclat-6C and 3.6× speedup over Eclat-1G. This figure also indicates that the performance ad vantage of Apriori-AP over Eclat GPU/multi-core increases as the size of the dataset grows.

Normalizing for Technology

The AP D480 chip is based on 45 nm technology while the Intel CPU Xeon E5-1650 and Nvidia Kepler K20C, on which Eclat is tested, are based on 32 nm and 28 nm technologies, respectively. To compare the different architectures in the same semiconductor technology mode, the performance of technology projections on 32 nm and 28 nm technologies in FIGS. 9 and 10 is shown assuming linear scaling for clock frequency and square scaling for capacity (Document 20). The technology normalized performance of Apriori-AP shows better performance than multi-core and GPU versions of Eclat in almost all of the ranges of support for all datasets, with the exception of small support for Pumsb and T100D20M. Apriori-AP achieves up to 112× speedup over Eclat-6C and 6.3× speedup over Eclat-1G.

Data Size

Figure 11:
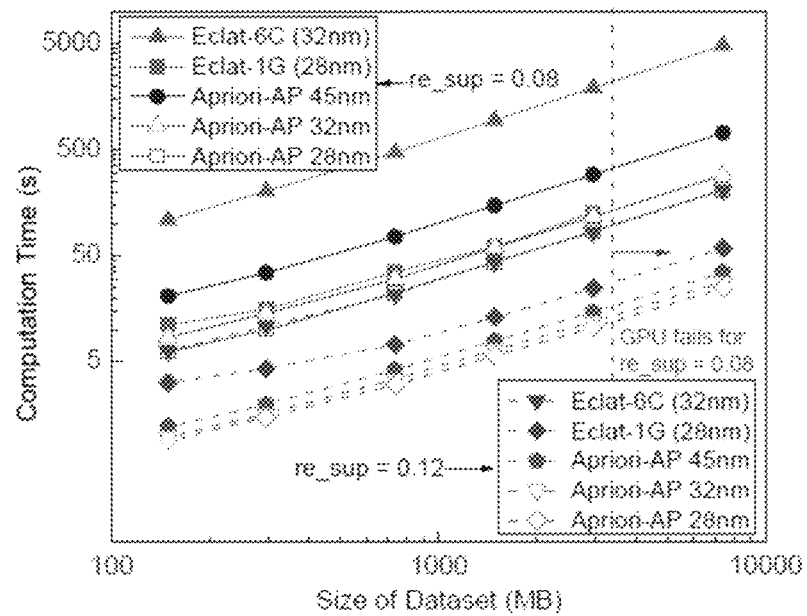
FIG. 11 illustrates performance prediction with technology normalization in accordance with some embodiments.
Figure 11:
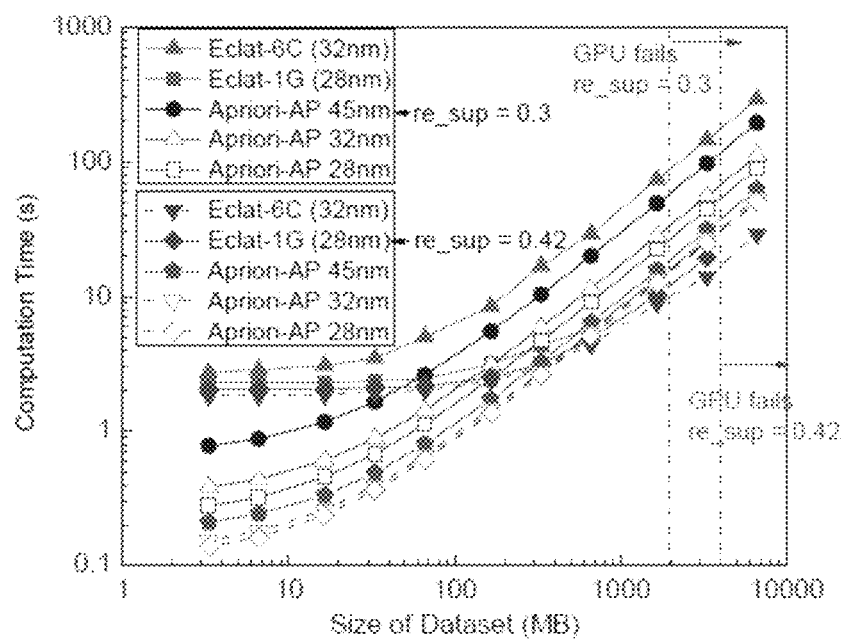

The above results indicate that the size of the dataset could be a limiting factor for the parallel Eclat algorithms. By varying the number of transactions but keeping other parameters fixed, the behavior of Apriori-AP and Eclat is studied as the size of the dataset increases (FIG. 11). For T100, the datasets with different sizes are obtained by the IBM synthetic data generator. For Webdocs, the different data sizes are obtained by randomly sampling the transactions or by concatenating duplicates of the whole dataset. In the tested cases, the GPU version of Eclat fails in the range from 2 GB to 4 GB because of the finite GPU global memory. Comparing the results using different support numbers on the same dataset, it is apparent that the smaller support number causes Eclat-1G to fail at a smaller dataset. This failure is caused by the fact that the ARM with a smaller support will keep more items and transactions in the data preprocessing stage. While not shown in this figure, it is reasonable to predict that the multi-core Eclat implementation would fail when the available physical memory is exhausted. However, Apriori-AP will still work well on much larger datasets, assuming the data is streamed in from the hard drive (assuming the hard drive bandwidth is not a bottleneck).

Automata Design Using Boolean Elements

The automata illustrated in Document 20 need a prerequisite that the items in each transaction are sorted. The sorting operation is therefore required in the pre-processing stage. In some cases, the pre-sorting decreases the overall performance (on-line data mining) or is infeasible (mining as disjunctive rules). To remove the prerequisite of sorted items, an alternative automaton design by using Boolean elements on the AP chip is proposed.

Figure 12:
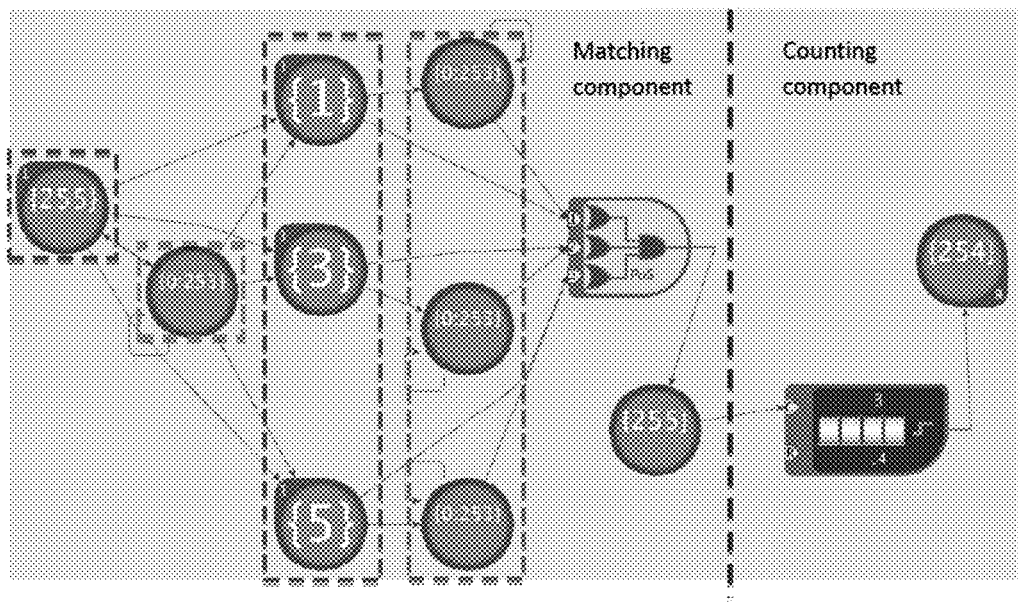
FIG. 12 illustrates automaton design for itemset matching and counting in accordance with some embodiments.

FIG. 12 shows an alternative automaton design for itemset matching and counting. In the following examples, the same 8-bit encoding scheme is adopted as described in Document 20: symbol "255" acts as the separator of transactions; "254" acts as the ending mark, of the input data stream; the symbol in the range of 0-253 is the ID of item.

FIG. 12 shows an automaton that matches and counts the itemset $\{1,3,5\}$ (the same function as the automaton shown in FIG. 3). However, the difference Is that Boolean element is used in this automaton. This automaton also has two components: matching component and counting component. The design of counting component is the same as that of the output-optimized version in Document 20 (see FIGS. 3 and 4; the optimization is described in Section V.D of Document 20). The idea of using Boolean element of the AP chip is to do logic "AND" operation on the items. That is, for a given itemset $\{i_1, i_2, i_3, \ldots i_n\}$, to observe if the one transaction has "$i_1$" "AND" "$i_2$" "AND" "$i_3$" "AND" "$i_n$". In FIG. 12, the red dashed line box contains the items of the interesting itemset. When one item has been seen in one transaction, the STEs in the blue dashed line box help to hold the position by self-activation and keep high signal to the Boolean element. Here, self-activation means the output signal wire of one STE connects back to its enable-input wire. Therefore, an STE with self-activation connection, called self-activating STE, activate itself when its symbol set matches input data stream. The operation between the STE for one item and the corresponding position-holder STE is "OR". Therefore, the Boolean element is configured as the product "AND" of sum ("OR") as shown in FIG. 12. The Boolean element is connecting to a STE that can recognize the separator symbol of transactions, "255". After the all items of a given itemset has been seen in the current transaction, this STE wait for the transaction separator to trigger the counter element. The STE in green dashed line box starts the item matching for the next transaction when it matches the transaction separator "255". Before the end of this transaction, the STE in orange dashed line box keeps activating item SETs in red dashed line box by self-activation design. The STE also keeps activating the starter STE in green dashed line box to wait for transaction separator symbol.

Figure 13:
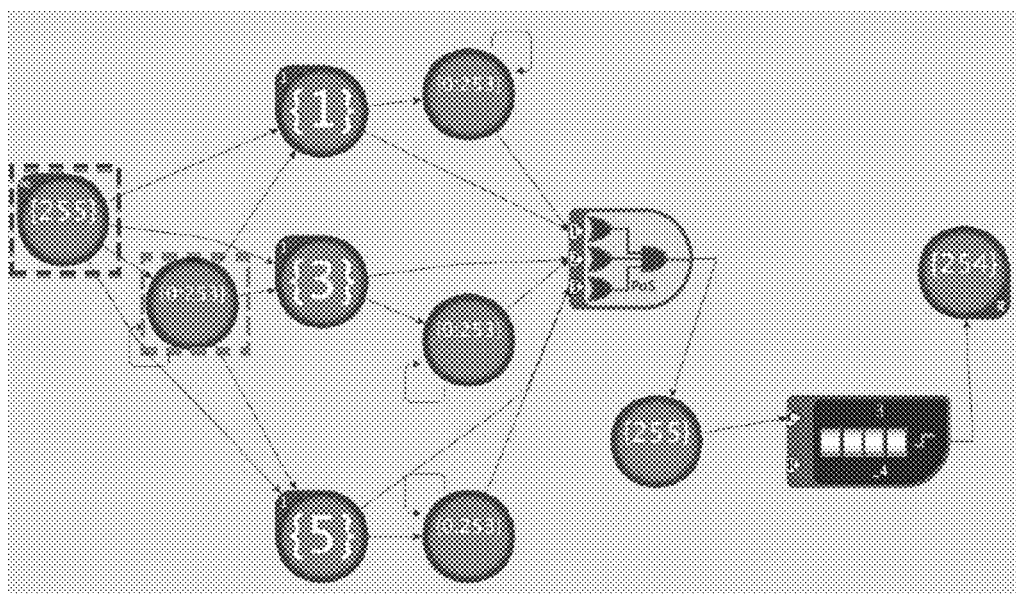
FIG. 13 illustrates another automaton design for itemset matching and coantingin accordance so with some embodiments.

FIG. 13 shows an alternative design. In this design, the starter STE (in the green dashed line box) is configured to accept every symbol in the data stream instead of accepting only the first symbol (FIG. 12). In the same time, the starter wires the STE in orange dashed line box by uni-direction connection. The starter with all-input mode showed in FIG. 13 will consume one extra STE (see Section III.C and V.D of Document 20). The automata in both FIGS. 12 and 13 can handle itemset with the sizes of 1, 2, and 3. The matching component in the automata shown in. FIG. 12 or 13 is called basic-matching automaton. If the size of itemset is less than 3, one can fill up the rest of the item STEs with wild-card symbol "*".

Figure 14:
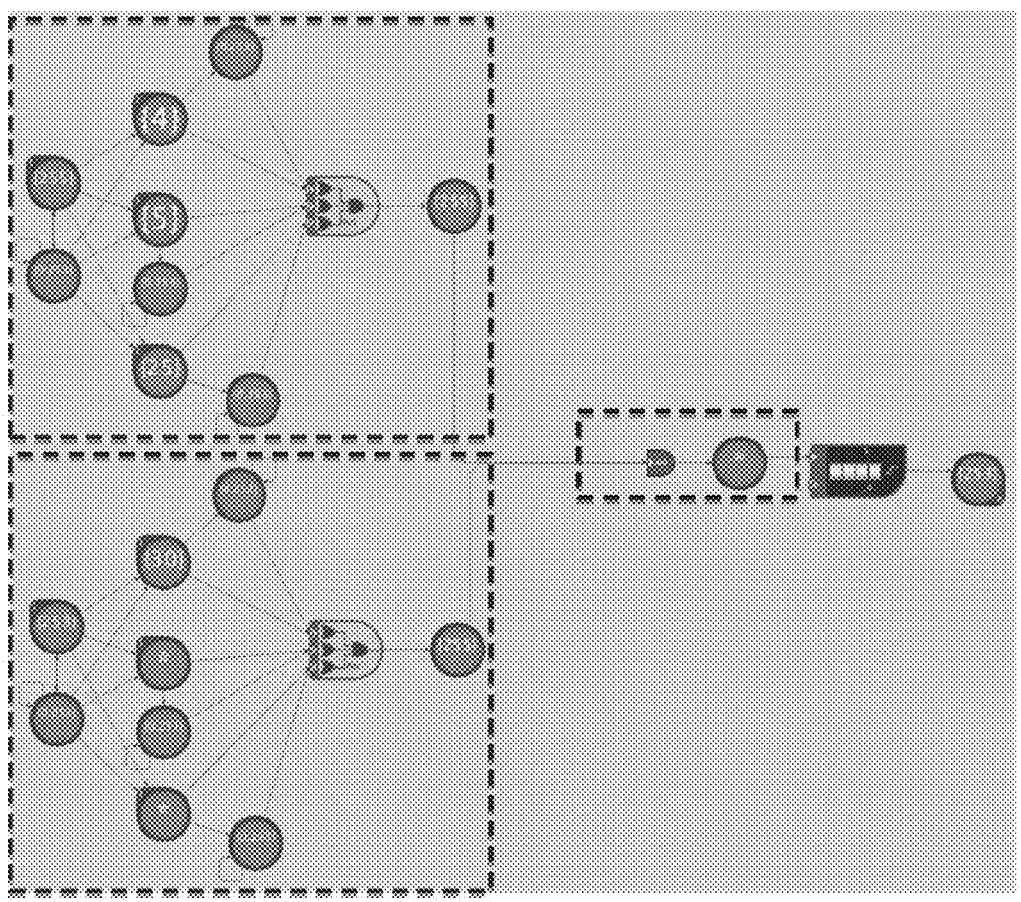
FIG. 14 illustrates automaton design with two-level Boolean logic in accordance with some embodiments.

To extend the automaton shown in FIG. 12 to handle the itemsets with more than 3 items, two strategies are proposed. The first strategy uses extra, levels of Boolean elements. FIG. 14 shows an example of this strategy. One purple dashed line box is a basic-matching automaton (matching of component the automaton design shown in FIG. 12 or 13), One extra "AND" Boolean element and the STE with wild-card symbol (blue dashed line box) format a new AND-group to do "AND" operation on the results from the two matching structures in purple dashed line boxes. Depending on the fan-in bandwidth of "AND" Boolean element, one can have more than two basic-matching automata as inputs to the AND-group. If the fan-in bandwidth of "AND" Boolean is a limiting factor, one more level of AND-group can be added. Whenever a level of AND-group (blue dashed line box) is added, the reports will be delayed by one cycle and one more stream ending-symbol ("254" in the current example) should be added to the end of the data stream to guarantee a correct result. The automaton design in FIG. 14 can handle the itemsets with sizes up to 6.

Figure 15:
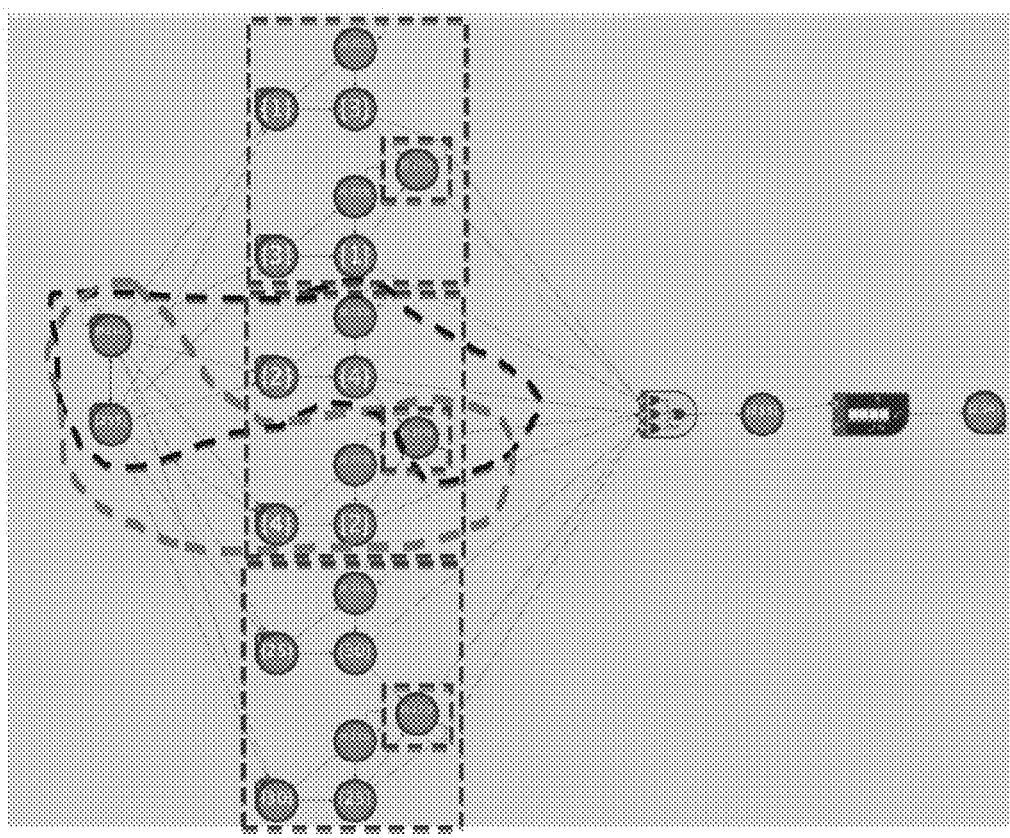
FIG. 15 illustrates automaton design with enumerating items' permutations in accordance with some embodiments.
Figure 16:
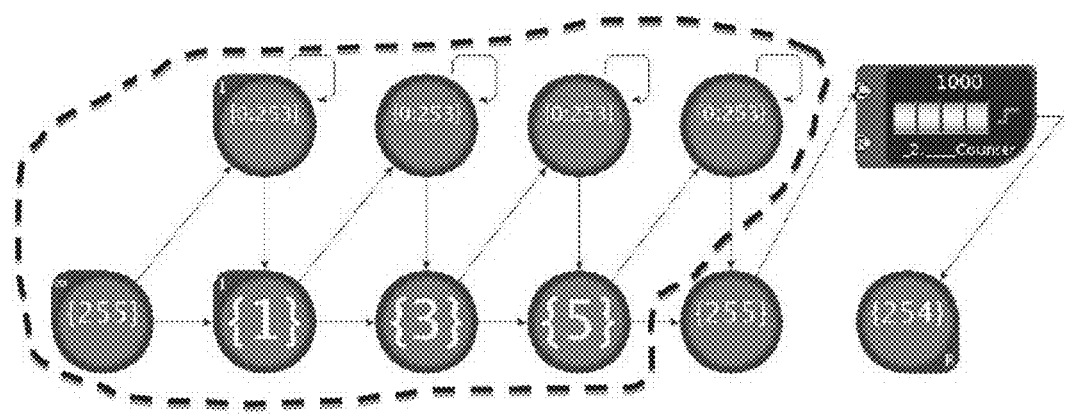
FIG. 16 illustrates FIG. 3 in Document 20.

The second strategy is to combine the automaton design in Document 20 and automaton design in FIG. 12. The idea is to divide the interesting itemset into small groups of two (or more) items, enumerate the permutations of each group (red dashed line box for each group), do "OR" operation on the permutations of each group and do "AND" operation over groups. The automaton within orange line or blue line dashed line regions is to capture a sequence of items (similar to the automaton design of the purple-line dashed line region of figure below). The automaton design in FIG. 15 enumerates all possible sequences of each item group. To save the STE usage, the left-most two STEs are shared across all permutations while the STEs in green dashed line box are shared within a group. The automaton design in FIG. 15 can handle the itemsets with sizes up to 6. It is also possible to divide the interesting itemset into larger group, but the STE usage will grow exponentially with the group size.

The first strategy is limited by the scarce resource of Boolean elements while the second strategy is limited by STE usage, it is desirable to hybrid these two strategies to make toll use the on-chip STE and Boolean element resources.

In the present invention, a hardware-accelerated ARM solution using Micron's new AP architecture is presented. The solution includes a novel automaton design for matching and counting to frequent itemsets for ARM. The multiple-entry NFA based design is disclosed to handle variable-size itemsets (ME-NRA-VSI) and avoid routing reconfiguration. The whole design makes full usage of the massive parallelism of the AP and can match and count up to 18,432 itemsets in parallel on an AP D480 48-core board. When compared with the Apriori-based single-core CPU implementation, the solution shows up to 129× speedup in the experimental results on seven real-world and synthetic datasets. This AP-accelerated solution also outperforms the multicore-based and GPU-based implementations of Eclat ARM, a more efficient algorithm, with up to 49× speedups, especially on large datasets. When performing technology projections on future generations of the AP, the results suggest even better speedups relative to the equivalent-generation of CPUs and GPUs. Furthermore, by varying the size of the datasets from small to very large, the results demonstrate the memory constraint of parallel Eclat ARM, particularly for GPU implementation. In contrast, the capability of the AP ARM solution scales nicely with the data size, since the AP was designed for processing streaming data.

With the challenge of the "big data" era, a number of other complex pattern mining tasks such as frequent sequential pattern mining and frequent episode mining, have attracted great interests as in both academia and industry. The CPU-AP infrastructure and automaton designs in the present invention are to be extended to address more complex pattern-mining problems.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

INDUSTRIAL APPLICABILITY

The framework described in the present invention can be extended to mine other types of the frequent patterns, e.g. frequent sequence, frequent disjunctive rule, and frequent episode. In addition, future commercial applications include arket basket analysis for recommendation systems, web usage mining, traffic accident analysis, intrusion detection, and bioinformatics.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

Figure 17:
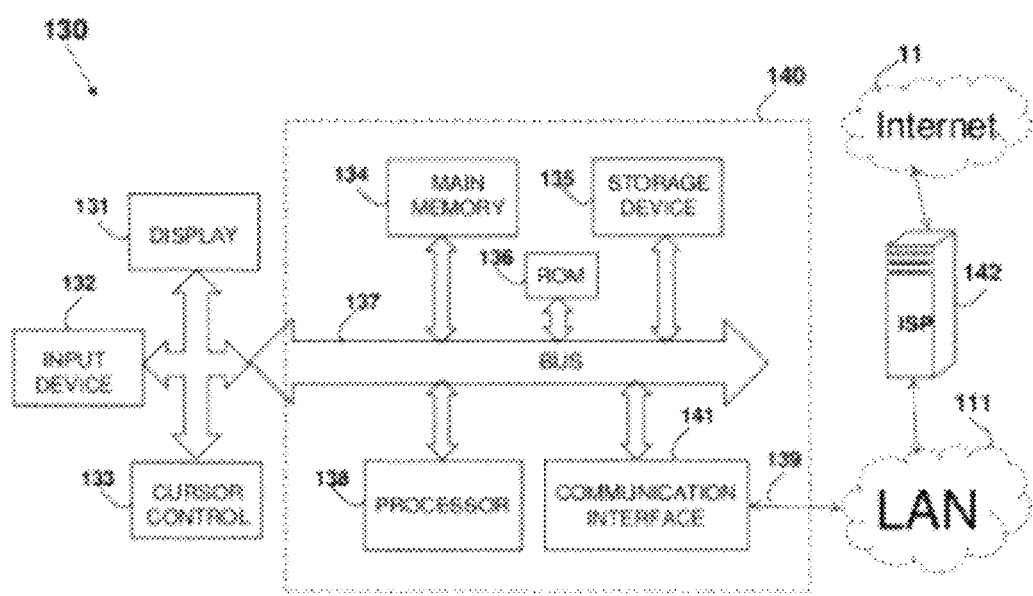
FIG. 17 is a block diagram that illustrates a system including a computer system and the associated Internet connection upon which an embodiment, or a portion thereof, may be implemented.
Figure 18:
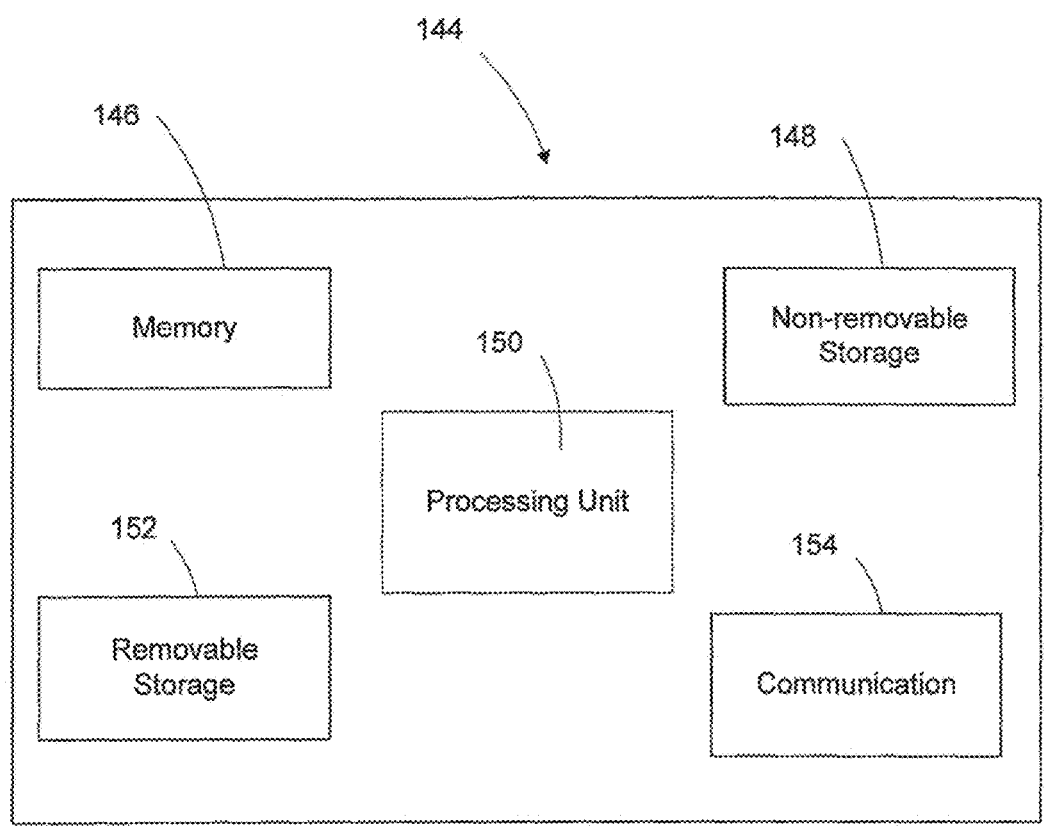
FIGS. 18 and 19 illustrate an exemplary computing device in which an embodiment of the invention, or a portion thereof, can be implemented.
Figure 19:
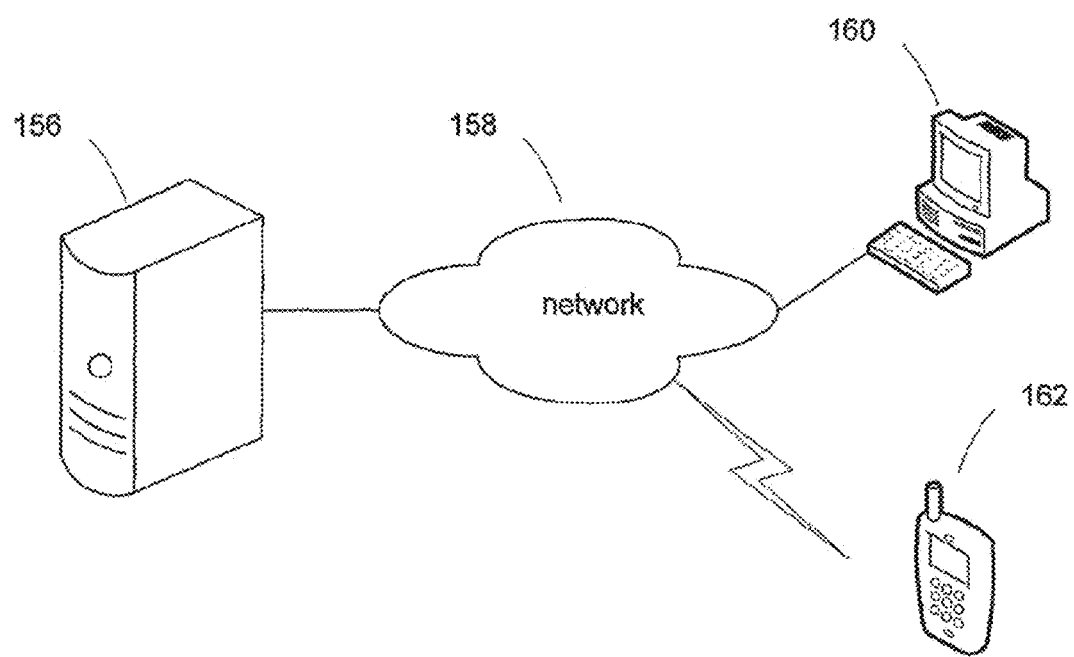

FIG. 17 is a block diagram that illustrates a system 130 including a computer system 140 and the associated Internet 11 connection upon which an embodiment, or a portion thereof, may be implemented. Such configuration is typically used for computers (hosts) connected to the Internet 11 and executing a server or a client (or a combinations software, A source computer such as laptop, an ultimate destination computer and relay servers, for example, as well as any computer or processor described herein, may use the computer system configuration and the Internet connection shown in FIG. 17. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 17 illustrates various components of a computer system, it is not intended to represent any particular architecture or manner of interconnecting the components; as such details are not germane to the present invention. It will also be appreciated that network computers, hand-held computers, cell phones and other data processing systems which have fewer components or perhaps more components may also be used. The computer system of FIG. 17 may, for example, be an Apple Macintosh computer or Power Book, or an IBM compatible PG Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138. Main memory 134 also may be used for storing temporary variables or other intermediate information during execution of instructions to be executed by processor 138. Computer system 140 further includes a Read Only Memory (ROM) 136 (or other non-volatile memory) or other static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux. The term processor is meant to include any integrated circuit or other electronic device (or collection of devices) capable of performing an operation on at least one instruction including, without limitation. Reduced instruction Set Core (RISC) processors, CISC microprocessors. Microcontroller Units (MCUs), CISC-based Central Processing Units (CPUs), and Digital Signal Processors (DSPs), The hardware of such devices may be integrated onto a single substrate (e.g., silicon die), or distributed among two or more substrates. Furthermore, various functional aspects of the processor may be implemented solely as software or firmware associated with the processor. Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane. The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein, in alternative embodiments, hard-wired circuitry may be used in place of or in combination with software instructions to implement the arrangement. Thus, embodiments of the invention are not limited to any specific combination of hardware circuitry and software. The term computer-readable medium (or machine-readable mediums as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio-wave and infrared data communications, or other form of propagated signals (e.g., carrier waves, Infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer-readable media may be involved in carrying one or more sequences of one or more instructions to processor 138 for execution. For example, the instructions may initially be carried on a magnetic disk of a remote computer. The remote computer can load the Instructions into its dynamic memory and send the instructions over a telephone line using a modem, A modem local to computer system 140 can receive the data on the telephone line and use an infra-red transmitter to convert the data to an infra-red signal. An infra-red detector can receive the data carried in the Infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138. Computer system 140 also includes a communication interface 141 coupled to bus 137. Communication interface 141 provides a two-way data communication coupling to a network link 139 that is connected to a local network 111. For example, communication interface 141 may be an Integrated Services Digital Network (ISDN.) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication 1-587005-001-3 (6/99), Internetworking Technologies Handbook, Chapter 7: Ethernet Technologies, pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet LAN91C111 10/100 Non-PCI Ethernet Single Chip MAC+PHY Data-Sheet, Rev. 15 (Feb. 20, 2004), which is incorporated in its entirety for all purposes as if fully set forth herein. Wireless links may also be implemented. In any such implementation, communication interface 141 sends and receives electrical, electromagnetic or optical signals that carry digital data streams representing various types of information. Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through, the communication interface 141, which carry the digital data to and from computer system 140, are exemplary forms of carrier waves transporting the information. A received code may be executed by processor 138 as it is received, and/or stored in storage device 135, or other non-volatile storage for later execution. In this manner, computer system 140 may obtain application code in the form of a carrier wave. Accordingly, an aspect of an embodiment provides, but not limited thereto, a system, method and computer readable medium for power pad placement of power delivery networks (PDN), which Is important in, for example, computer-automated-design (CAD) of integrated circuits, and more particularly, the optimization of power pad locations and transient noise control. It should be appreciated that the related optimization system and method and the related networks, computer systems, internet, and components and functions may be implemented according to the scheme(s) disclosed herein. Various embodiments or aspects of the invention, for example, can be implemented as software in a computing device, or alternatively, on hardware. An exemplary computing device in which an embodiment of the invention, or a portion thereof, can be implemented is schematically illustrated in FIGS. 18 and 19. Although some aspects may be known, a brief explanation will be provided herein for the convenience of other readers. Referring to FIG. 18, in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two. Additionally, device 144 may also have other features and/or functionality. For example, the device could also include additional removable and/or non-removable storage including, but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device. The device may also contain one or more communications connections 154 that allow the device to communicate with other devices (e.g. other computing devices). The communications connections carry information in a communication media. Communication media typically embodies computer readable instructions, data structures, program modules or other data in a modulated data signal such as a carrier wave or other transport mechanism and includes any information delivery media. The term modulated data signal means a signal that has one or more of its characteristics set or changed in such a manner as to encode, execute, or process information in the signal. By way of example, and not limitation, communication medium includes wired media such as a wired network or direct-wired connection, and wireless media such as radio, RP, infrared and other wireless media. As discussed above, the term computer readable media as used herein includes both storage media and communication media. In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example, FIG. 19 illustrates a network system in which embodiments of the invention can be implemented. In this example, the network system comprises computer 156 (e.g. a network servers, network connection means 158 (e.g. wire and/or wireless connections), computer terminal 160, and PDA (e.g. a smart-phone) 162 (or other handheld or portable device, such as a cell phone, laptop computer, tablet computer, GPS receiver, mp3 player, handheld video player, pocket projector, etc. or handheld devices (or non portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g. server 156), whereas other processing and execution of the instruction can be performed at another computing device (e.g. terminal 160) of the network system, or vice versa, in fact, certain processing or execution can be performed at one computing device (e.g. server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g. disk) or electronic copy. Practice of an aspect of an embodiment (or embodiments) of the invention is presented herein for illustration only and should not be construed as limiting the invention in any way. An approach of the present invention systems and designs and optimization system and techniques may be based on the tools, programs and operating systems as discussed throughout this disclosure, such techniques can be applied to various hardware, tools, operating systems, virtual machine, PVM, or executable format. It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A processor for discovering a pattern of frequently associated items in large datasets, the processor comprises functional elements comprising:
   a plurality of state transition elements based on memory columns implemented in DRAM (Dynamic Random-Access Memory) memory technology;
   a plurality of counters; and
   a plurality of boolean elements,
   wherein the processor is capable of fast replacement of symbol sets of the plurality of state transition elements and threshold values of the plurality of counters,
   wherein the plurality of counters and the plurality of boolean elements are designed to work with the plurality of state transition elements to increase space efficiency of automata implementation,
   wherein the pattern includes sets, continuous sequences, and discontinuous sequences in the large datasets,
   wherein the plurality of state transition elements include a reporter configured to trigger output from the processor only when an end of stream symbol of a transaction stream matches to the reporter to minimize the output from the processor,
   wherein the processor is configured to produce one output vector when the processor reaches the end of the transaction stream, and
   wherein the plurality of counters are configured to connect to a finite automaton to count occurrences of the pattern in the datasets and make reports or activate the functional elements when a predetermined threshold is reached.

2. The processor according to claim 1, wherein the processor is implemented in PCRAM (Phase-Change Random-Access Memory), STTRAM (Spin-Transfer Torque Random-Access Memory), or RRAM (Resistive Random-Access Memory).

3. The processor according to claim 1, wherein each of the plurality of state transition elements is configured to match a set of any multiple-bit signals.

4. The processor according to claim 1, wherein a group of the plurality of state transition elements is connected to implement a non-deterministic finite automaton (NFA) to match the pattern in the large datasets.

5. The processor according to claim 1, wherein the finite automaton is accommodated on a chip and is capable of matching and counting a plurality of patterns in parallel.

6. The processor according to claim 1, wherein the processor takes input streams of multiple-bit signals and is capable of processing a plurality of data streams concurrently.

7. The processor according to claim 1, wherein any of the functional elements are configured as a reporting element, wherein the reporting element generates a one-bit or multiple-bit signals when the functional elements match with input streams of multiple-bit signals.

8. An automaton design method of discovering a pattern of frequently associated items in large datasets by a processor, the method comprising steps of:
applying Apriori algorithm framework for reducing a search space in the datasets;
preprocessing an input data set for making it compatible with a working interface of the processor;
designing automata for implementing matching and counting of the pattern in the datasets, and
delaying reporting of events to a final processing cycle,
wherein the pattern includes sets, continuous sequences, and discontinuous sequences in the large datasets,
wherein the reporting of events is triggered only when an end of stream symbol of a transaction stream matches to one of a plurality of state transition elements in the processor in order to minimize an output from the processor,
wherein the processor is configured to produce one output vector when the processor reaches the end of the transaction stream, and
wherein a plurality of counters in the processor are configured to connect to a finite automaton to count occurrences of the pattern in the datasets and make reports or activate functional elements in the processor when a predetermined threshold is reached.

9. The automaton design method according to claim 8, wherein the matching is implemented by a finite automaton.

10. The automaton design method according to claim 8, wherein the matching is capable of capturing the patterns in the datasets.

11. The automaton design method according to claim 9, wherein the pattern is represented by a linearly connected array of states of automata with one or more states of automata grouped together to match one multiple-bit signal from input streams of multiple-bit signals.

12. The automaton design method according to claim 10, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

13. The automaton design method according to claim 8, wherein the sets are converted to the discontinuous sequences by sorting items of each transaction with a predefined order.

14. The automaton design method according to claim 8, wherein on-chip Boolean logic components are utilized to discover occurrence of every item of a given associated item set and to identify a superset of the given set.

15. The automaton design method according to claim 14, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

16. The automaton design method according to claim 8, wherein the counting uses an on-chip counter of the processor to calculate a frequency of the pattern associated items in the datasets.

17. The automaton design method according to claim 8, wherein the preprocessing of the input data set in the datasets further comprises steps of:
filtering out infrequent items from the input data set;
encoding the filtered items into multiple-bit signals; and
sorting the encoded items within one transaction with a given order.

18. The automaton design method according to claim 17, the preprocessing of the input data set is iterated to explore all sets of the frequently associated items in the large datasets.

19. An electronic automaton device for discovering a pattern of frequently associated items in large datasets comprising:
a processor comprising functional elements, the function element comprising:
a plurality of state transition elements based on memory columns implemented in DRAM (Dynamic Random-Access Memory) memory technology;
a plurality of counters; and
a plurality of boolean elements,
wherein the processor is capable of fast replacement of symbol sets of the plurality of state transition elements and threshold values of the plurality of counters,
wherein the plurality of counters and the plurality of boolean elements are designed to work with the plurality of state transition elements to increase space efficiency of automata implementation,
wherein the pattern includes sets, continuous sequences, and discontinuous sequences in the large datasets,
wherein the plurality of state transition elements include a reporter configured to trigger output from the processor only when an end of stream symbol of a transaction stream matches to the reporter to minimize the output from the processor,
wherein the processor is configured to produce one output vector when the processor reaches the end of the transaction stream, and
wherein the plurality of counters are configured to connect to a finite automaton to count occurrences of the pattern in the datasets and make reports or activate the functional elements when a predetermined threshold is reached.

20. The electronic automaton device according to claim 19, wherein the pattern is represented by a linearly connecting array of states of automata with one or more states of automata grouped together to match one multiple-bit signal from input streams of multiple-bit signals.

21. The electronic automaton device according to claim 20, wherein one or more self-activating states of automata connected to one group of states of automata for multiple-bit signals to hold a position within a potential pattern sequence when a mismatching of multiple-bit signals is seen, and hold this position until an end of an transaction, in order to deal with the discontinuous sequences.

22. The electronic automaton device according to claim 19, wherein the sets are converted to the discontinuous sequences by sorting items of each transaction with a predefined order.

23. The electronic automaton device according to claim 19, wherein on-chip Boolean logic components are utilized to discover occurrence of every item of a given associated item set and to identify a superset of the given set.

24. The electronic automaton device according to claim 19, wherein one or more self-activating states of automata connect to one group of states of automata for multiple-bit signals to hold a position within a potential pattern sequence when a mismatching of multiple-bit signals is seen, and hold this position until an end of an transaction, in order to deal with the discontinuous sequences.

25. The electronic automaton device according to claim 19, wherein the plurality of counters are connected to a pattern matching automaton to calculate a frequency of the pattern in the datasets.

* * * * *